(12) United States Patent
Guo et al.

(10) Patent No.: US 12,469,479 B2
(45) Date of Patent: Nov. 11, 2025

(54) GYROID-BASED ACOUSTIC MATERIALS AND DEVICES

(71) Applicant: The Regents of the University of Colorado, Denver, CO (US)

(72) Inventors: Yuning Guo, Boulder, CO (US); Massimo Ruzzene, Boulder, CO (US); Matheus Rosa, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 310 days.

(21) Appl. No.: 18/225,224

(22) Filed: Jul. 24, 2023

(65) Prior Publication Data

US 2024/0029698 A1    Jan. 25, 2024

Related U.S. Application Data

(60) Provisional application No. 63/369,325, filed on Jul. 25, 2022.

(51) Int. Cl.
*G10K 11/162* (2006.01)
*G10K 11/30* (2006.01)

(52) U.S. Cl.
CPC ............ *G10K 11/162* (2013.01); *G10K 11/30* (2013.01)

(58) Field of Classification Search
CPC .............................. G10K 11/162; G10K 11/30
See application file for complete search history.

(56) References Cited

U.S. PATENT DOCUMENTS

| | | | | |
|---|---|---|---|---|
| 9,058,798 | B2* | 6/2015 | Walker | G10K 11/04 |
| 2013/0025961 | A1* | 1/2013 | Koh | G10K 11/162 |
| | | | | 181/207 |
| 2021/0056948 | A1* | 2/2021 | Liang | G10K 11/30 |

OTHER PUBLICATIONS

Cai et al., "Symmetry-enforced three-dimensional Dirac phononic crystals", Light: Science & Applications 9:38, Mar. 10, 2020, 6 pages.
Fruchart et al., "Soft self-assembly of Weyl materials for light and sound", PNAS vol. 115, No. 16, Apr. 2, 2018, 10 pages.
Fruchart et al., "Supporting Informations to Soft self-assembly of Weyl materials for light and sound" PNAS vol. 115, No. 16, Apr. 2, 2018, 11 pages.
Guo et al., "Minimal Surface-Based Materials for Topological Elastic Wave Guiding", Advanced Functional Materials, 32, 2022, 11 pages.

(Continued)

*Primary Examiner* — Forrest M Phillips
(74) *Attorney, Agent, or Firm* — Cozen O'Connor

(57) ABSTRACT

An acoustic device includes a three-dimensional phononic crystal having cubic symmetry. The phononic crystal includes a first region filled with a first material and a second region filled with a solid material that is different from the first material. The second region is the solid complement of the first region. A boundary between the first and second regions is shaped as a single gyroid surface that has constant mean curvature and is not pinched off. The volume of the second region is greater than or equal to that of the first region. The first material may be a gas, such as air, or a fluid. The phononic crystal supports topological surface states, has a band structure with at least one degenerate point protected by nonsymmorphic symmetry, and exhibits negative refraction where two of its external surfaces meet.

19 Claims, 16 Drawing Sheets

(56) References Cited

OTHER PUBLICATIONS

Goi et al., "Gyroid "srs" Networks: Photonic Materials Beyond Nature", Advanced Functional Materials, 6, 2018, 17 pages.
He et al., "Observation of quadratic Weyl points and double-helicoid arcs", Nature Communications, 2020, 6 pages.
He et al., "Topological negative refraction of surface acoustic waves in a Weyl phononic crystal", Nature vol. 560, Aug. 2, 2018, 9 pages.
Lu et al., "Experimental observation of Weyl points", Science vol. 349 Issue 6248, Aug. 7, 2015, 4 pages.
Luo et al., "Observation of a phononic higher-order Weyl semimetal", Nature Materials vol. 20, Jun. 2021, 7 pages.
Sychov, et al. "Mechanical properties of energy-absorbing structures with triply periodic minimal surface topology" Acta Astronautica, 150, 2018, 5 pages.
Schoen et al., "Infinite Periodic Minimal Surfaces Without Self-Intersections", National Aeronautics and Space Administration, May 1970.
Yang et al., "Effect of geometry on the mechanical properties of Ti-6Al-4V Gyroid structures fabricated via SLM: A numerical study", Materials & Design, 184, 2019, 24 pages.
Yang et al., "Observation of a topological nodal surface and its surface-state arcs in an artificial acoustic crystal", Nature Communications, 2019, 7 pages.
Yang et al., "Topological triply degenerate point with double Fermi arcs", Nature Physics vol. 15, Jul. 2019, 6 pages.

\* cited by examiner

GYROID-BASED ACOUSTIC MATERIALS AND DEVICES

RELATED APPLICATIONS

This application claims priority to U.S. Provisional Patent Application No. 63/369,325, filed on Jul. 25, 2022, the entirety of which is incorporated herein by reference.

STATEMENT REGARDING FEDERALLY SPONSORED RESEARCH OR DEVELOPMENT

This invention was made with government support under grant number 1741685 awarded by the National Science Foundation. The government has certain rights in the invention.

BACKGROUND

The single gyroid is a triply periodic minimal surface with body-centered cubic symmetry. It features multiple rotational axes and screw axes as well as numerous axial and diagonal glide planes, but does not have any mirror symmetry. Accordingly, the single gyroid is chiral in nature.

SUMMARY

The present embodiments include acoustic materials created from three-dimensional (3D) blocks whose shape is based on the single gyroid geometry. These acoustic materials exhibit unique behavior in which the acoustic energy only propagates on the surfaces of the 3D block material. The gyroid structure supports topological surface modes for a broad frequency range with a relative bandwidth up to 45% (and higher). Prototypes built with additive manufacturing illustrate the robust surface modes that appear on the surface of the sample.

The acoustic materials of the present embodiments can confine acoustic energy at the surface of the material while negating sound propagation through its interior. Thus, the present embodiments can be used for soundproofing, noise control, filtering, switching, and sensing, among other applications. For example, the acoustic materials of the present embodiments can be fabricated as sound panels that can be installed in a room for sound insulation.

DETAILED DESCRIPTION

Figure 1:
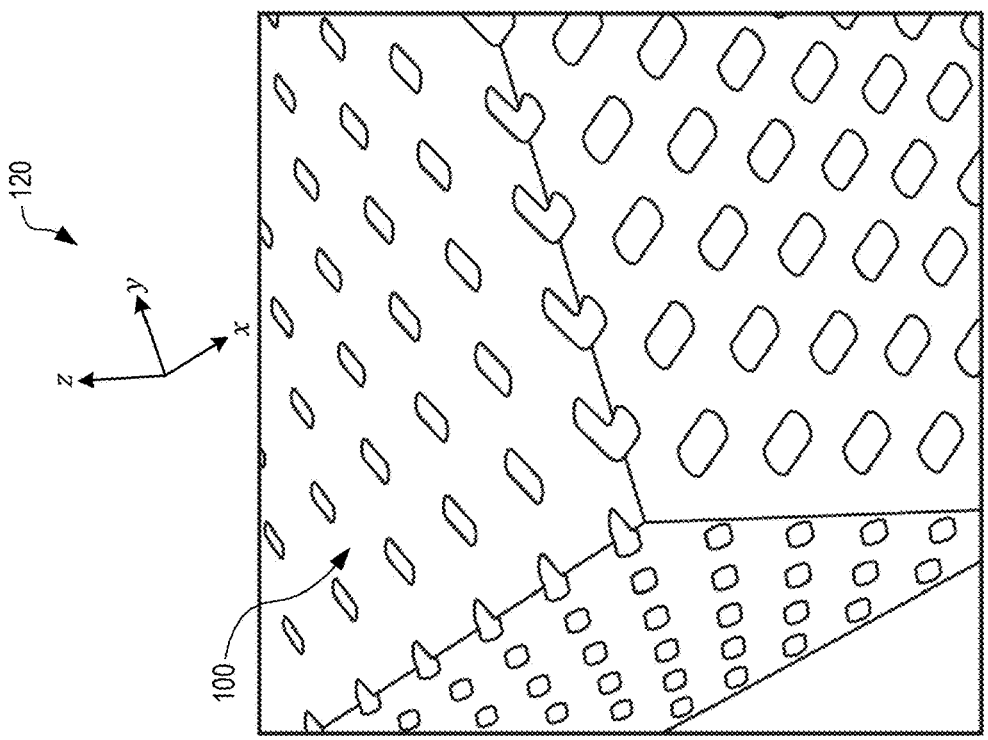
FIG. 1 shows two perspective views of a gyroid-based acoustic material that is based on a three-dimensional (3D) phononic crystal, or 3D lattice, having cubic symmetry, in an embodiment.
Figure 1:
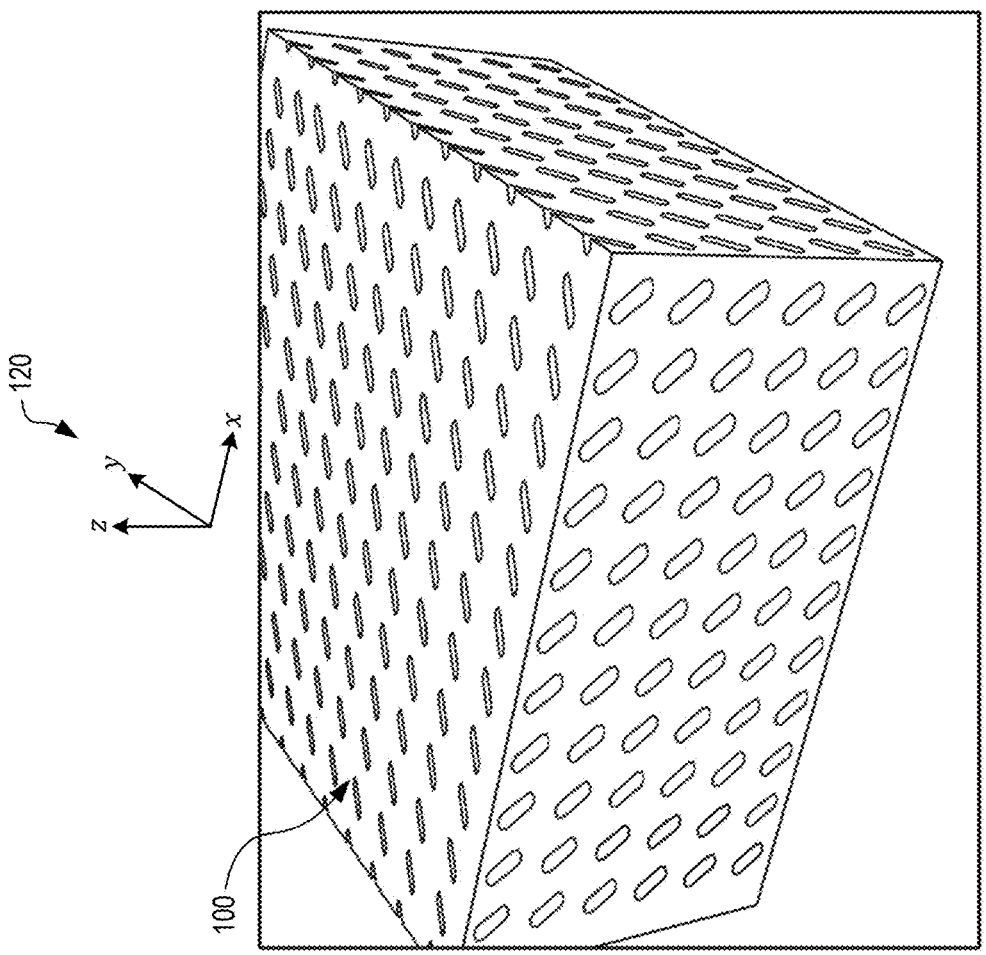

FIG. 1 shows two perspective views of a gyroid-based acoustic material that is based on a three-dimensional (3D) phononic crystal 100, or 3D lattice, having cubic symmetry. The phononic crystal 100 has three primitive translation vectors that are mutually orthogonal and aligned with the x, y, and z axes of a right-handed coordinate system 120. Accordingly, x, y, and z are the primitive axes of the phononic crystal 100, and therefore the lattice sites, or cells, of the phononic crystal 100 extend linearly along x, y, and z. In the example of FIG. 1, the phononic crystal 100 has 12 cells along x, 12 cells along y, and 6 cells along z. However, the phononic crystal 100 may have a different number of cells along any one or more of the x, y, and z axis without departing from the scope hereof. The phononic crystal 100 of FIG. 1 is three-dimensional in that it contains more than one cell along each of the three primitive axes. The acoustic material of FIG. 1 may also be referred to as an acoustic device without departing from the scope hereof.

Figure 2:
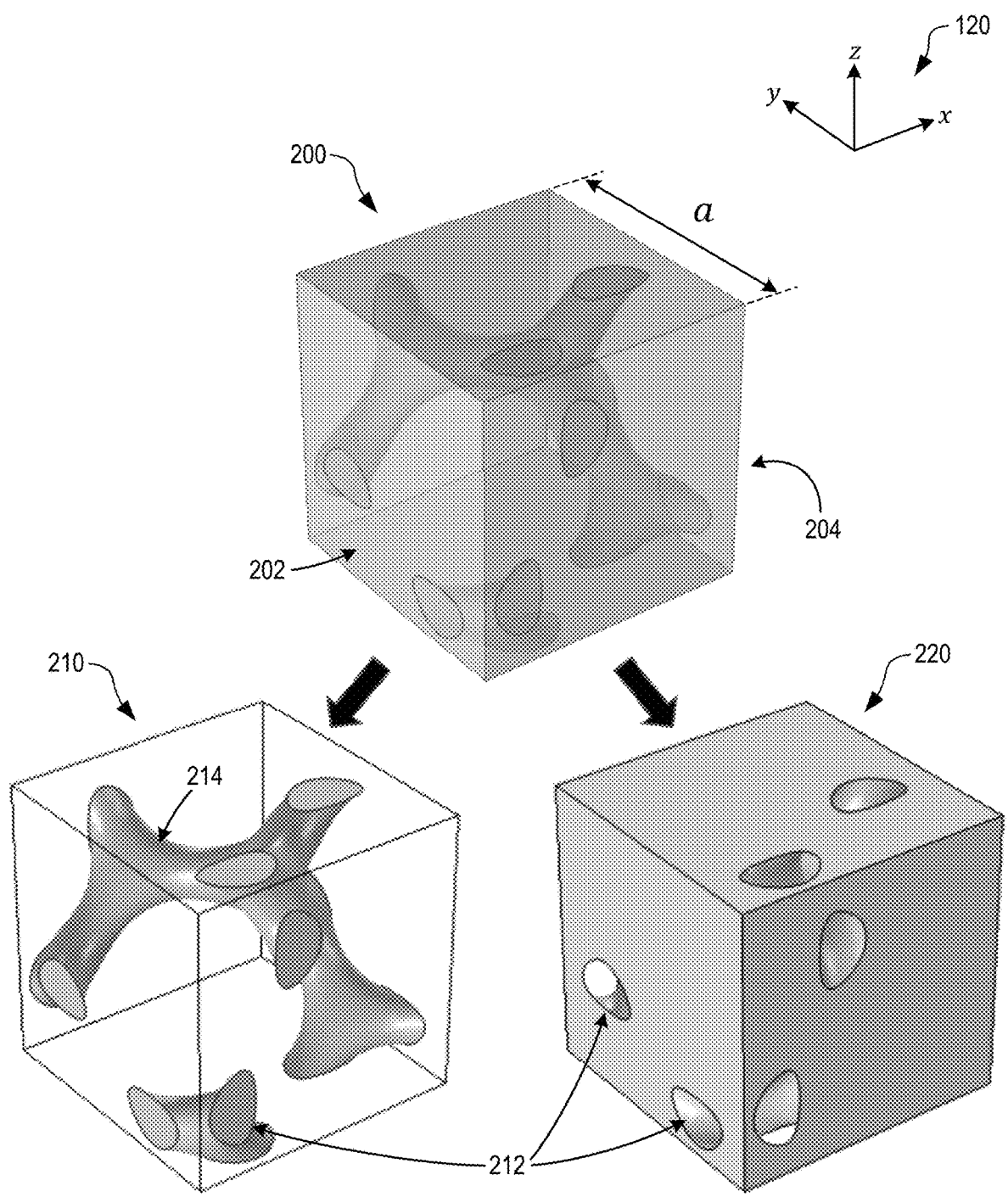
FIG. 2 is a perspective view of a unit cell of the 3D phononic crystal of FIG. 1, in an embodiment.

FIG. 2 is a perspective view of a unit cell 200 of the 3D phononic crystal 100 of FIG. 1. All cells of the phononic crystal 100 are replicas of the unit cell 200. The unit cell 200 is shaped as a cube of length a that is spatially bounded by six planar faces. For clarity in FIG. 2, only two of these planar faces are labeled: a first planar face 202 lying parallel to the y-z plane and a second planar face 204 that is also parallel to the y-z plane and opposite to the first planar face 202. The length a of the unit cell 200 is also the lattice constant of the 3D phononic crystal 100. While FIG. 2 shows the unit cell 200 as a cube, the unit cell 200 may be, more generally, another type of cuboid (e.g., a rectangular cuboid).

The working frequency range of the 3D phononic crystal 100 is determined by the unit cell length, or lattice constant, a. For acoustic frequencies (e.g., 20 Hz-20 kHz), a may be between a few millimeters and a few meters. For ultrasonic frequencies, (e.g., greater than 20 kHz) a may be a fraction of a millimeter, or less (e.g., 1 micron, or a fraction thereof). For infrasonic frequencies (e.g., less than 20 Hz), a may be several meters, or more. However, a may have a different value without departing from the scope hereof. In some embodiments, a is less than one-half of the acoustic wavelength, in which case the phononic crystal 100 is a phononic metamaterial.

FIG. 2 also shows how a boundary 214 partitions the unit cell 200 into a first region 210 and a second region 220. The second region 220 is the solid complement of the first region 210, i.e., the second region 220 includes all points in the unit cell 200 that do not belong to the first region 210. Thus, the intersection of the regions 210 and 220 is the null set while the union of the regions 210 and 220 is the entire unit cell 200.

The second region 220 is filled with a solid material while the first region 210 is filled with a first material that is different from the solid material. The volume fraction is the ratio of the volume of the second region 220 to the volume $a^3$ of the unit cell 200. In some embodiments, the volume fraction is greater than or equal to 50%. Equivalently, the volume of the second region 220 is greater than the volume of the first region 210. As described in more detail below, some of the present embodiments can achieve a volume fraction up to approximately 97.1%, or more.

By forming the second region 220 from a solid material, as opposed to the first region 210, the phononic crystal 100 advantageously has a volume factor of at least 50%, helping to ensure that the phononic crystal 100 is structurally rigid and therefore can be handled without deforming, or otherwise damaging, its physical structure.

The solid material of the second region 220 is harder than the material filling the first region 210. For example, the phononic crystal 100 may be fabricated by 3D printing only the second region 220 of each cell. In this case, the solid material can be any material that can be 3D printed, such as plastic, metal, glass, ceramic, polymer, carbon fiber, resin, or any combination thereof. In some embodiments, the solid material is an electrical insulator. In other embodiments, the solid material is an electrical conductor. The first region 210 may be filled with a fluid, such as air, an inert gas, or liquid. Regardless of materials, the solid material is "hard" in that it has an acoustic impedance that is larger than that of the material filling the first region 210. Accordingly, when crossing the boundary 214, the acoustic impedance undergoes a step-like transition. Under these conditions, the boundary 214 acts like a hard boundary.

The boundary 214 is shaped as a single gyroid surface having a constant mean curvature. In the present embodiments, the single gyroid surface is not in the pinch-off regime. As known in the art, the single gyroid surface can be mathematically approximated by the isosurface function $$F=\cos(\tilde{x})\sin(\tilde{y})+\cos(\tilde{y})\sin(\tilde{z})+\cos(\tilde{z})\sin(\tilde{x}), \qquad (1)$$

where $\tilde{x}=2\pi x/a$, $\tilde{y}=2\pi y/a$, and $\tilde{z}=2\pi z/a$ are scaled spatial coordinates along the x, y, and z axes, respectively, and F is a constant that is related to (but not identical with) the constant mean curvature. The volume fraction also depends on the value of F. Equation 1, which is also known as a level surface, is only mathematically defined for $|F|\leq 1.5$.

FIGS. 3A-3H are plots of the single-gyroid isosurface of Eqn. 1 for various values of F. In FIGS. 3A-3H, the top image is a perspective view of the single-gyroid isosurface over the unit cell 200 while the bottom image is the same perspective view taken over an array of 2×2×2 cells. FIGS. 3A-3H are best viewed together with the following description.

Figures 3A, 3B, 3C, 3D:
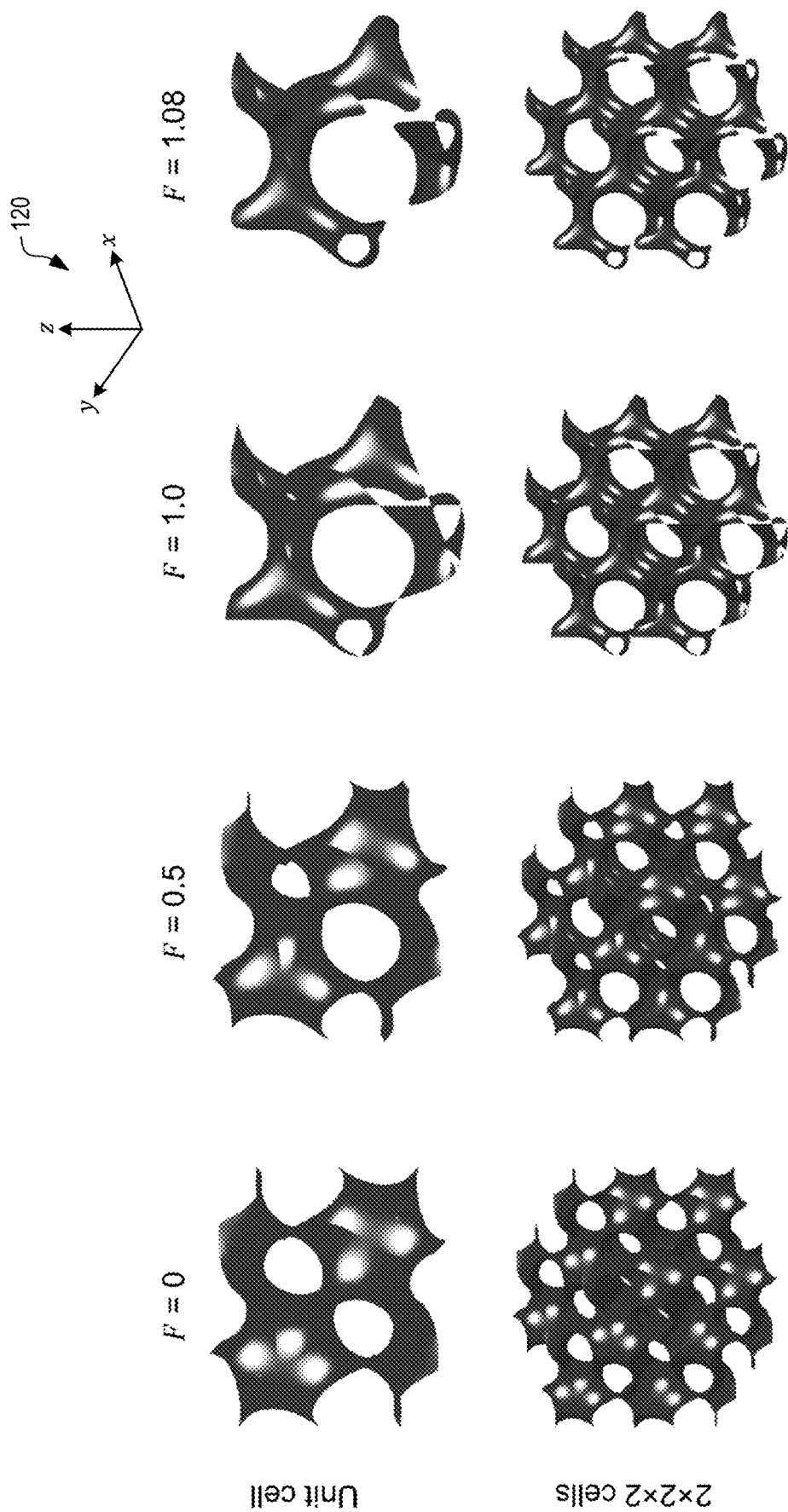
FIGS. 3A-3H are plots of the single-gyroid isosurface for various values of the parameter F.

In FIGS. 3A and 3B, F=0 and 0.5, respectively. In FIG. 3A, the resulting single-gyroid isosurface divides the space into regions 210 and 220 that have the same volume, i.e., the volume fraction is 50%. In FIG. 3B, the single-gyroid isosurface divides the space into regions 210 and 220 having different volumes, i.e., the volume fraction is greater than 50%. The surface shown in FIG. 3A approximates the minimal gyroid surface, for which the constant mean curvature is zero. Since the isosurface in FIG. 3A only approximates a true single gyroid surface, its mean curvature is close to, but not exactly, zero.

In some embodiments, the constant F has a value such that $1\leq F<1.413$. FIGS. 3C-3F show gyroid surfaces for F=1.0, 1.08, 1.2, and 1.4, respectively. In the range $1\leq F<1.413$, the constant mean curvature is great enough that the single gyroid isosurface locally loops back onto itself. In this case, the first region 210 forms a network of tubes, or closed channels, that pass through the bulk of the unit cell 200. Acoustic wave propagation within the bulk of the phononic crystal 100 is essentially confined to these closed channels. The tubes form ports where they intersect the boundaries of the phononic crystal 100, such as ports 212 shown in FIG. 2 (F=1.2 for the boundary 214 in FIG. 2, and is therefore the same gyroid surface as in FIG. 3E). For F=1.0, the volume fraction is 83%. The 3D phononic crystal 100 of FIG. 1 has F=1.08.

It is also apparent from FIGS. 3C-3F that the first region 210 becomes discontinuous for $1\leq F<1.413$, but only within the unit cell 200. When the unit cell 200 is repeated to form a 3D crystal or lattice, the discontinuous sections join together in neighboring cells, as shown in the bottom images of FIGS. 3C-3F. Thus, across the entire 3D crystal, the first region 210 is continuous (ignoring one remaining discontinuous section at the bottom corner of the 3D crystal).

Figures 3E, 3F, 3G, 3H:
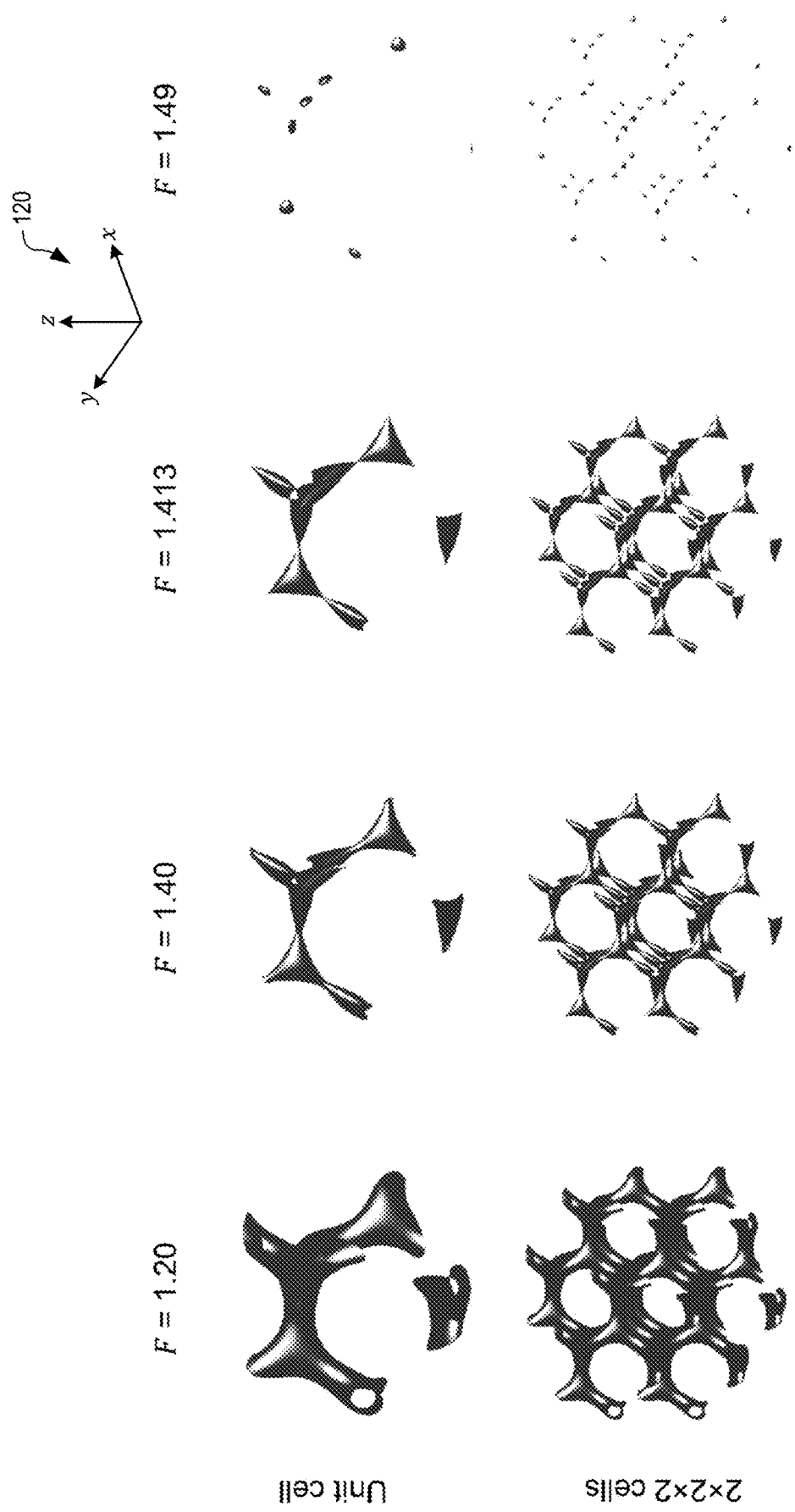

In FIGS. 3G and 3H, F=1.413 and 1.49, respectively. Starting at F=1.413, the tubes of the first region 210 become "pinched-off," thereby causing the first region 210 to fracture into eight discontinuous sections. For this reason, the range of values $F\geq 1.413$ is also known as the "pinch-off regime." In some of the present embodiments, the single gyroid surface is not pinched-off, i.e., F<1.413. At F=1.413, the volume fraction is approximately 97.1%. Accordingly, the volume fraction of these embodiments is less than this value.

The 3D phononic crystal 100 of FIG. 1 may be shaped as any three-dimensional geometric object (e.g., block, sphere, cylinder, etc.) or an approximation thereof. For example, the 3D phononic crystal 100 of FIG. 1 may be shaped as a panel whose width and length are both greater than its thickness. Such a panel may be used as an acoustic material for walls, floors, or ceilings of a room. The panel, when installed, has a front surface that is visible from inside of the room. In some embodiments, the panel includes an outer layer that fully covers the front surface. This outer layer visibly hides the ports at the front surface, giving the panel a visibly smooth appearance. Thus, the outer layer is similar to the paper layers used to cover the gypsum cores of sheetrock and other types of wallboard panels. In the present embodiments, the outer layer may be paper, foil (e.g., aluminum), or another type of material. While the outer layer will alter the boundary conditions for acoustic propagation, the geometry of the 3D phononic crystal 100 ensures that the panel can form surface states regardless of whether the ports are covered or not. Accordingly, the outer cover will not prevent the panel from achieving its intended functionality. In other embodiments, a rear surface of the panel (i.e., the surface opposite to the front surface) is also covered with an outer layer. In other embodiments, the front and rear surfaces are uncovered, in which case the ports are visible on both of these surfaces.

Experimental Demonstration

1. Introduction

Due to their complex morphologies and symmetries, triply periodic minimal surfaces have attracted interest for structured materials that achieve superior mechanical properties. Such surfaces efficiently tessellate space, and therefore can be used to create structured materials with high stiffness and strength [1-6] while also incorporating additional functionalities such as frequency band gaps [7], topological waveguiding [8], energy absorption [9], and thermal management [10]. The gyroid surface, which is one type of triple periodic minimal surface, is endowed by a spiral-like shape with cubic symmetry and chiral morphology whose properties have been explored in various fields including biology, mechanics, optics, and acoustics [11-20]. The observation of gyroid morphologies in nature and self-assembly systems also suggests that its architecture is mechanically robust [20-22]. In addition, materials based on gyroid surfaces applied as photonic crystals have shown extraordinary optical properties such as complete bandgaps, linear/circular dichroism, and Weyl points and line nodes [17, 18, 23-25]. Despite these achievements, the potential of gyroid-structured materials for topological wave physics phenomena has not been fully explored in the context of acoustics and elastic waves.

We here investigate an acoustic gyroid crystal and exploit the non-trivial acoustic dispersion topology that naturally occurs due to its unique geometry and symmetry. The ensuing topological surface states have not yet been demonstrated in 3D continuous material platforms such as minimal surface-based architectures. In parallel to the development of gapped phases of topological insulators [26-29], gapless phases have been recently observed in the so-called "topological semimetals" [30-32], based on which classical analogues have been explored in both photonic and phononic systems [24, 33-41]. These semimetals have band structures with multi-fold band degeneracies points like Weyl and Dirac points, or other touching patterns like nodal lines and nodal rings, which do not require a band gap and can result in Fermi arcs associated with topologically protected surface states [42-44]. Recent studies illustrate that multi-fold topological band degeneracies are protected by crystalline space-group symmetries in electric, photonic, and phononic systems [40, 41, 45, 46]. Two established configurations for phononic semimetal states are based on layer-stacked honeycomb lattices with proper interlayer coupling [37, 38], and cubic lattices with nonsymmorphic symmetries [39-41]. These notable studies advance the state of the art by implementing topological surface states in phononics, however they rely on demonstrator models with ad hoc designs that are not readily applicable as compact continuous materials. Also, minimal surface-based materials were shown to integrate efficient load-bearing capabilities with the robust topological waveguiding features of gapped insulators [8] and therefore may provide a path toward continuous materials hosting gapless topological states.

We experimentally demonstrate a 3D gyroid acoustic crystal that hosts multi-fold topological degenerate points which are associated with the existence of topological surface states. Indeed, the gyroid surface is a natural candidate for exploring non-trivial dispersion topology within a continuous material platform due to its nonsymmorphic symmetry. The results presented herein illustrate the emergence of spin-1 Weyl and charge-2 Dirac degenerate points whose topological character is connected to chiral topological states whose propagation is confined to the surfaces of the material. In addition to surface confinement, the topological states define open arcs in reciprocal space, which makes their propagation along the surfaces highly directional. These topological states were experimentally observed on an additive manufactured sample, illustrating the ability to control the propagation of waves at the surface of the material.

The experimental results described herein demonstrate how directional-wave properties resulting from surface arcs in reciprocal space produce negative refraction of surface modes propagating across the interface between two neighboring facets of the 3D material. These features are naturally enforced by the nonsymmorphic symmetry of the gyroid, revealing that gapless topological states can widely exist in this class of continuous materials without fine parameter tuning or delicate symmetry designs, which do not provide self-contained material platforms. A gyroid embedded with a rigid material provides the framework for the design of an acoustic material that leverages topological waveguiding and directional propagation which may translate into sound redirection and insulation capabilities.

2. Geometry of Gyroid Acoustic Crystals

Figure 4:
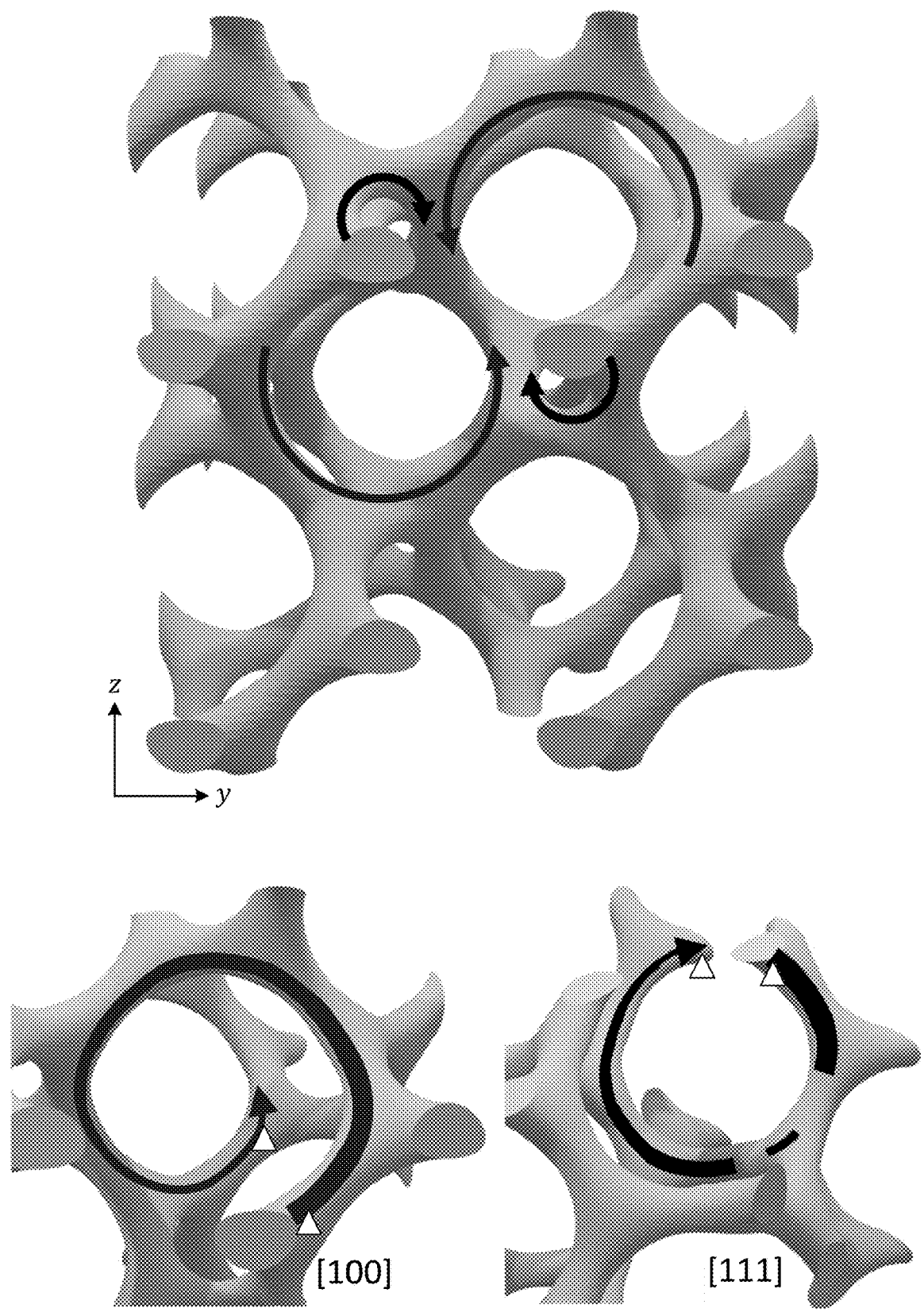
FIG. 4 illustrates the inherent chirality of the gyroid surface. Spiral lines indicate the left-handed and right-handed helices.

Crystal symmetry plays a critical role in the physics of topological materials. In this context, 3D band degenerate points introduced by nonsymmorphic symmetries provide an effective approach to realize 3D semimetal states through a combination of point group symmetry and translation of a Bravais lattice vector [47, 48]. The single gyroid, a triply periodic minimal surface with body-centered cubic symmetry, belongs to the nonsymmorphic space $I4_132$ (No. 214, a subgroup of $Ia\bar{3}d$). It features multiple rotational axes and screw axes as well as numerous axial and diagonal glide planes, but does not have any mirror symmetry, and therefore it is chiral in nature [18, 46, 49-51]. The gyroid can be defined by the isosurface function $F=\cos(x)\sin(y)+\cos(y)\sin(z)+\cos(z)\sin(x)$, where the parameter F defines the morphology type (also see Eqn. 1). For $0\leq|F|<1$, the gyroid forms a single surface that partitions the space into two regions, as illustrated by the first region 210 and second region 220 in FIG. 2. In the range $1<|F|<1.413$, the gyroid surfaces define closed channels with open ports at the boundaries, as illustrated for $F=1.08$ in FIGS. 2 and 3D [1, 17, 52]. In this section, the value $F=1.08$ is utilized to define the geometry of gyroid channels within a rigid material. This produces an acoustic crystal, within which spiral channels support the airborne propagation of acoustic waves. These spiral channels are also referred to herein as "airborne gyroid channels." Local helices along the screw axes of the gyroid can be identified in different directions, e.g., [100], [001], or [111] (see [17, 53]). The chirality of a gyroid surface in the y-z plane is illustrated in FIG. 4, where left-handed helices and right-handed helices are shown in black. The zoomed views at the bottom of FIG. 4 illustrate the chiral paths that connect two points (white triangular markers) translated by a unit cell along the [100] and [111] directions. FIG. 1 shows perspective views of the fabricated 3D sample of gyroid acoustic crystal, whereby the solid material occupies the region that is complementary to the airborne gyroid channels. The sample consists of 12×12×6 unit cells in a cubic lattice structure with the lattice spacing $a=10$ mm, and is fabricated through fused deposition modeling using a Markforged printing machine (see Experimental Section below). Considering the large acoustic impedance mismatch between the solid material and the air, the acoustic-solid boundaries are treated as rigid and sound propagates only through the gyroid channels. The results that follow focus on the choice $F=1.08$ as a demonstration, but similar properties are found in the entire regime $1<|F|<1.413$ since it results in similar morphologies.

3. Results

Figure 5A:
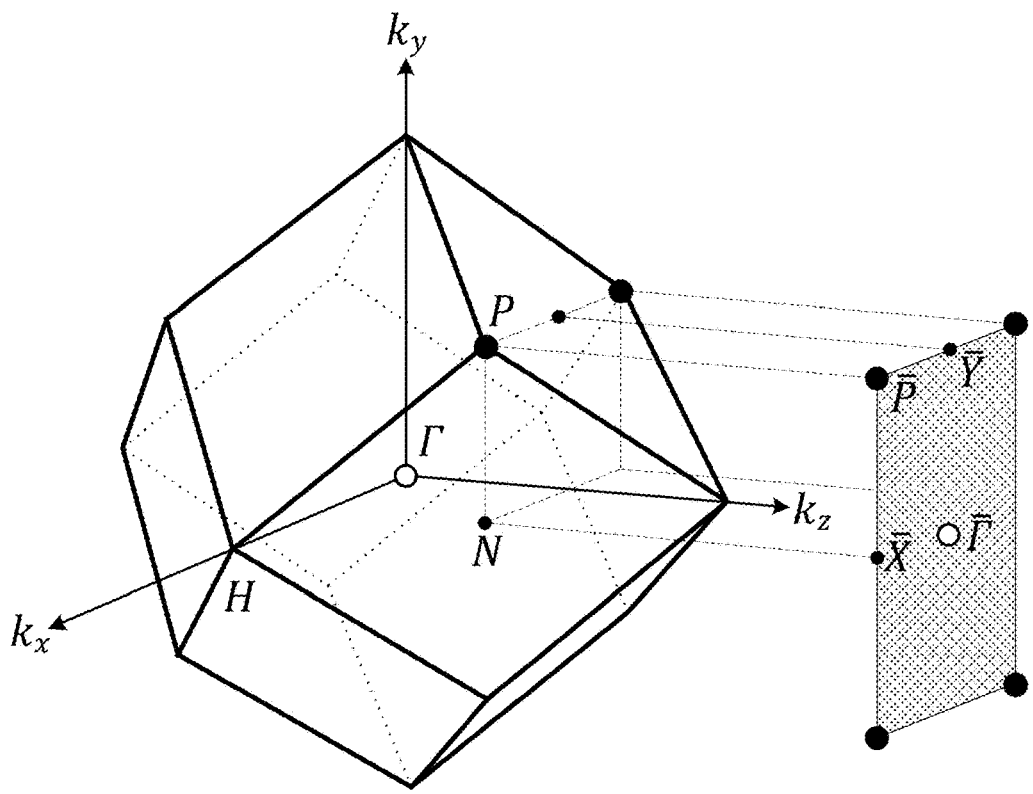
FIG. 5A shows the 3D Brillouin zone (BZ) of a single gyroid surface and the corresponding surface BZ projected onto the $k_x$-$k_y$ plane. Symmetry points in the 3D BZ are identified without overbars while corresponding projected symmetry points in the surface BZ are identified with overbars.
Figure 5B:
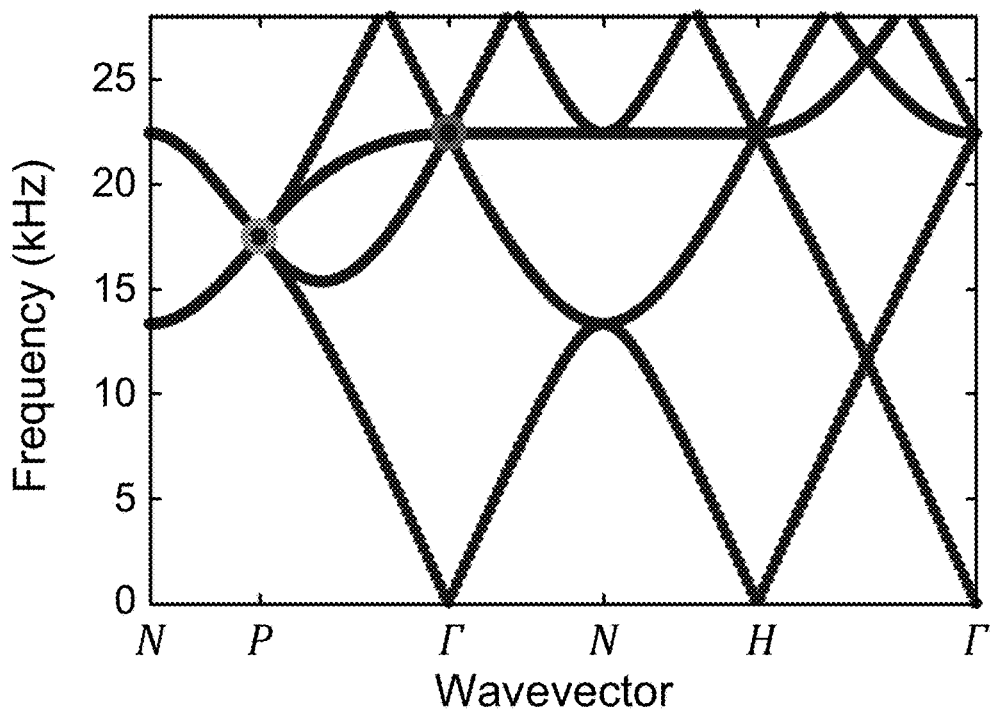
FIG. 5B is a band structure plot illustrating bulk dispersion along the high symmetry lines of the 3D BZ of FIG. 5A.

We first investigate the dispersion and wave propagation properties of the gyroid acoustic crystal through numerical simulations conducted within the COMSOL Multiphysics software (see Experimental Section for details on numerical simulations). FIG. 5A shows the 3D body-center cubic Brillouin zone (BZ) and a projected surface BZ for the considered gyroid. The 2D surface BZ is obtained by projecting the 3D BZ onto a specific plane, in this case the x-y plane. The dots denote the positions of the symmetry points P and Γ in the 3D BZ and the corresponding projected symmetry points $\bar{P}$ and $\bar{\Gamma}$ in the surface BZ. The bulk dispersion of the acoustic gyroid material of geometry and size corresponding to the experimental sample shown in FIG. 1 is displayed in FIG. 5B along the high symmetry lines of the 3D BZ. It exhibits a fourfold degenerate band crossing at the high-symmetry point P (the four bands consisting of two sets of doubly degenerate bands), and a threefold degenerate band crossing at Γ. These degenerate nodal points are protected by the nonsymmorphic symmetry of the gyroid surface [45, 48]. Here, we focus on the properties of the symmetry-enforced degeneracies at P and Γ within 13-28 kHz, but there are other band degenerate points appearing at a higher frequency range (34-48 kHz) or other symmetry lines like the ΓH line, which may also be considered in future studies.

Figure 5D:
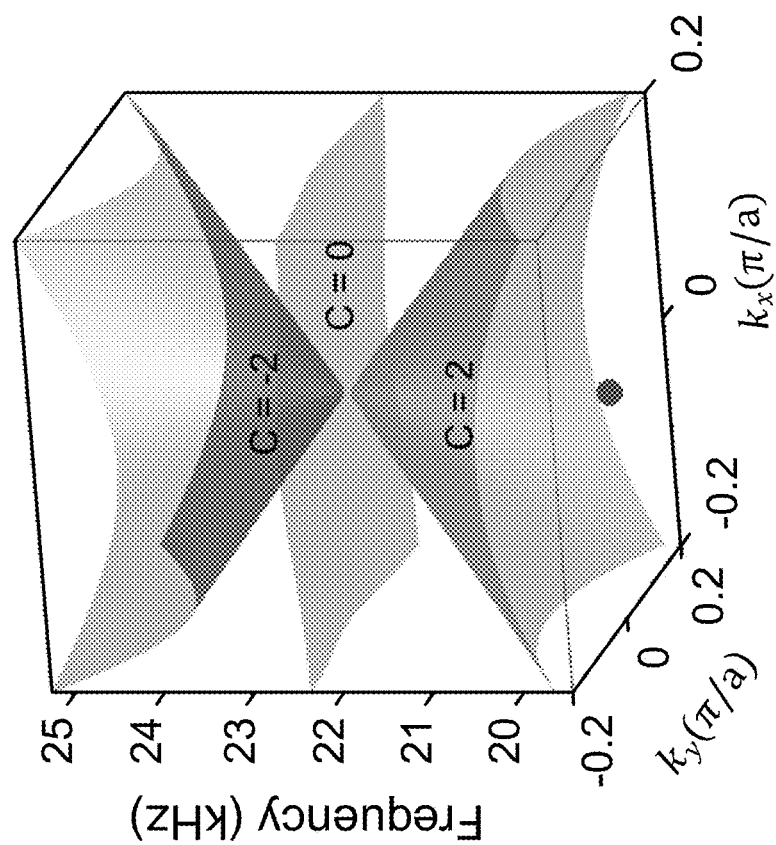
FIG. 5D is a band structure plot illustrating surface dispersion in the vicinity of a triple degenerate point. The Chern number of each band is labeled.
Figure 5C:
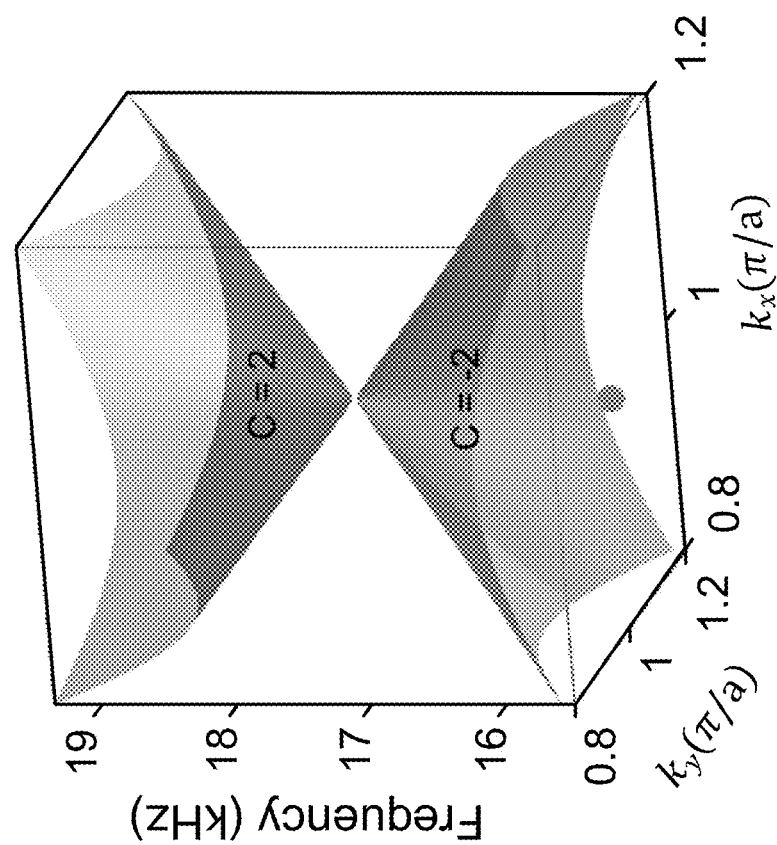
FIG. 5C is a band structure plot illustrating surface dispersion in the vicinity of a quadruple degenerate point. The Chern number of each band is labeled.

FIGS. 5C and 5D show the surface dispersion on the $k_x$-$k_y$ plane in the vicinity of the quadruple and triple degenerate points at P and r, respectively, where linear dispersions are observed around the degeneracies. The non-trivial topological character of the bands is evidenced by their Chern numbers C, which are computed from the evolution of the Wannier centers around closed loops in the 3D BZ by using the Wilson loop method [40, 54, 55]. The Chern numbers of the two doubly degenerate bands in FIG. 5C are calculated to be −2 and +2, signaling the degeneracy at P is a charge-2 Dirac point [56-58]. The four eigenmodes at the charge-2 Dirac point define two sets of modes with opposite chirality. The bands crossing at this point exhibit linear dispersion in all directions in the 3D momentum space, which further confirms that this quadruple degenerate point is a Dirac point. Meanwhile, the three bands in the vicinity of the triple degenerate point at Γ exhibit Chern numbers of −2, 0, and +2, respectively, indicating that this degenerate point is a threefold spin-1 Weyl point [58-60]. This deduction is also evidenced by eigenmodes of distinct chirality and the linear dispersions crossing at this point. The charge-2 Dirac point and spin-1 Weyl point are enforced by the nonsymmorphic symmetry of the gyroid material, illustrating that multifold degeneracies with Chern numbers greater than 1 naturally occur in this class of continuous materials without requiring intricate ad hoc designs [42, 61, 62].

Figure 5E:
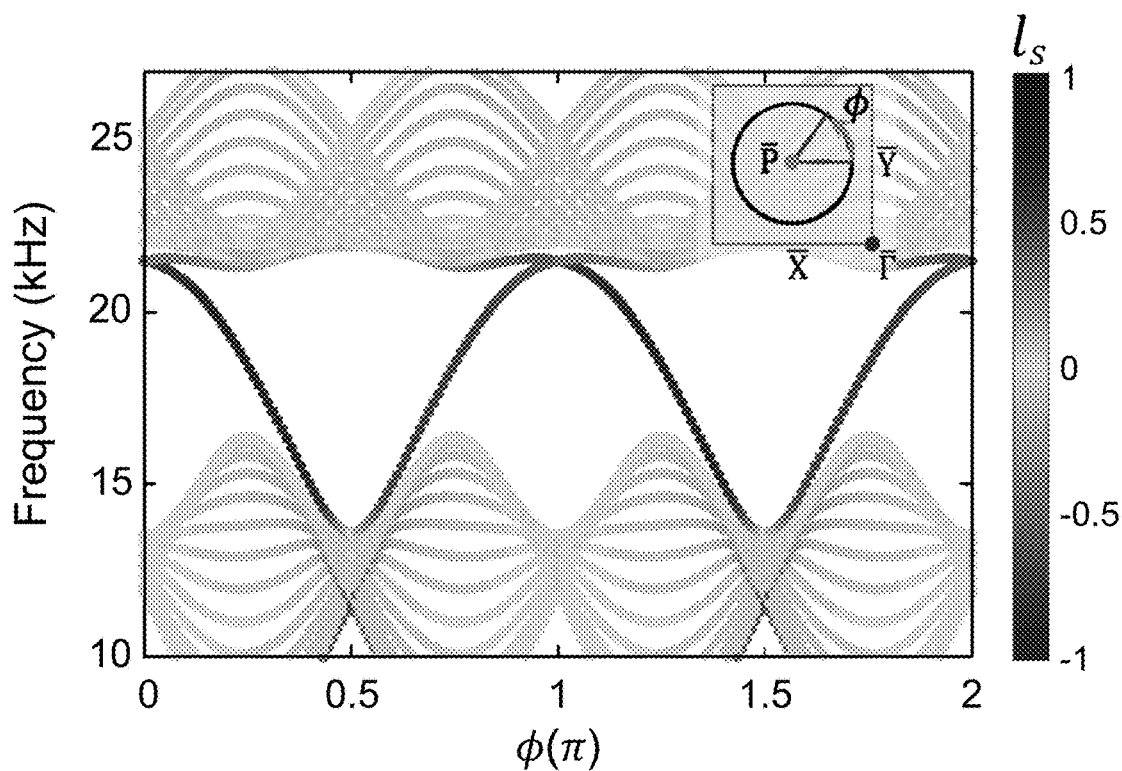
FIG. 5E is a band structure plot illustrating surface dispersion along a circular momentum loop centered at the projected symmetry point $\overline{P}$ of the surface BZ of FIG. 5A. The inset shows the circular loop of radius $0.75\pi/a$ centered at $\overline{P}$. The branches are shaded based on the polarization of the corresponding modes, as defined by the localization factor $l_s$.

According to the bulk-edge correspondence principle, a degeneracy with non-zero topological results in surface states that can be identified along a closed loop encircling the degeneracy in the projected surface BZ [35]. This is illustrated in the inset of FIG. 5E, which depicts the 2D surface dispersion along a circular loop of radius $0.75\pi r/a$ centered at $\bar{P}$. The dispersion is obtained by using a ribbon structure consisting of 1×1×8 cells with rigid boundaries along the z direction and periodic boundary conditions applied along the x and y directions. Surface states are identified by computing a localization factor $l_s$ for each mode. The localization factor is defined based on the ratio between the integral of the pressure field at the surfaces and the integral across the entire ribbon, indicating a surface mode when its value approaches ±1, or a bulk mode when it approximates zero. The dispersion branches of the ribbon are shaded according to $l_s$, whereby surface modes localized at the top and bottom surfaces are respectively associated with positive and negative values (dark shading), while bulk modes are associated with $l_s$ close to zero (light shading). Four chiral surface bands are identified, two with positive slope corresponding to modes localized at the bottom surface and two with negative slope corresponding to modes localized at the top surface. This behavior is expected from the degenerate charge-2 Dirac point with −2/+2 Chern numbers. These surface modes also circle around $\bar{\Gamma}$. We note that the gyroid acoustic crystal supports chiral surface states regardless of the type of surface termination as enforced by the topological degeneracy, but the dispersion of the surface states may be different under different termination types. The sensitivity with respect to surface terminations provides an additional degree of freedom which opens the possibility of tailoring the surface states on 3D bulk materials [16].

Figure 5F:
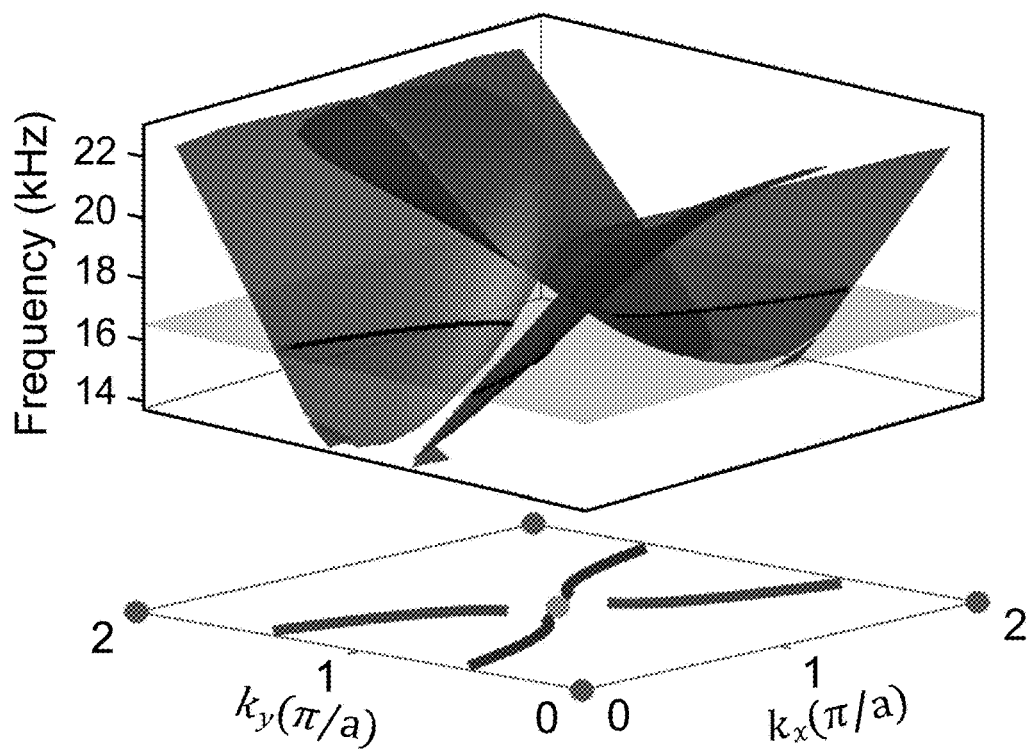
FIG. 5F is a band structure plot illustrating dispersion of surface states in the surface BZ centered at the projected symmetry point $\overline{P}$ (upper panel). The isofrequency contour with a frequency of 16.5 kHz (bottom panel) acts as a demonstration of open surface arcs.

The dispersion of the identified surface modes is displayed in the upper panel of FIG. 5F along the entire surface BZ in the projected $k_x$-$k_y$ plane. The four sheets of the surface states surround the degenerate point, spanning a broad frequency range with a relative bandwidth $\Delta\omega/\omega$ of about 45%. The contours of the surface states at any frequency define open arcs analogous to the well-known Fermi arcs of electronic systems [63, 64]. An example of the open arcs at a frequency of 16.5 kHz is highlighted in the surface plot, and displayed in the bottom panel of FIG. 5F. Their chiral nature implies that only one pair of the four arcs is defined at a single surface (the other pair being localized at the opposite surface) making their propagation through the specific surface highly directional. While the x-y plane was selected to exemplify the nature of the surface states, these would also exist in other planes such as the x-z or y-z planes, which we will later use to demonstrate negative refraction through states of different surfaces.

Figure 6A:
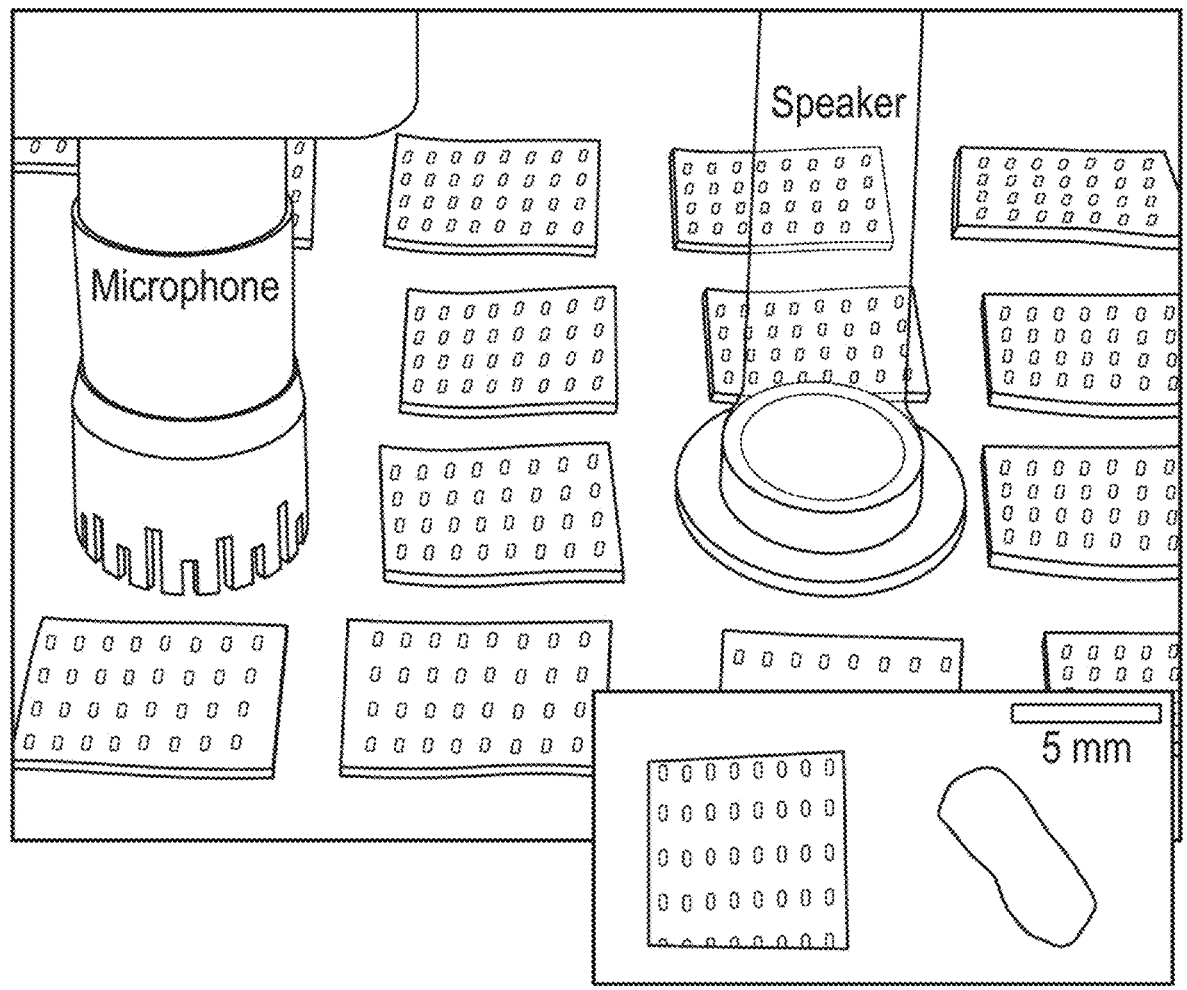
FIG. 6A shows the setup for measuring the acoustic field on the top x-y surface of the sample. The holes of airborne channels at a surface to be mapped are sealed by duct tape, except for a reserved hole around the center of the surface for signal excitation and a hole for signal detection.

Experimental measurements were performed to identify the topological surface states, which are unveiled by the acoustic surface field mapping and associated Fourier spectra. FIG. 6A shows the measurement setup for mapping the acoustic field at the top surface of the sample. To excite the surface states, a broadband acoustic signal is fed to a speaker connected to a subwavelength-sized tube that is placed at a hole at the center of the sample surface. The acoustic pressure was measured hole-by-hole by a ¼-inch microphone (GRAS type BD 46) and recorded by a dynamic signal analyzer (see Experimental Section). To mimic the rigid boundary conditions considered in the simulations, the other holes on the upper surface were sealed with duct tape, except for the excitation and measurement holes. A photograph showing the detail of a sealed hole and an unsealed hole is shown in the inset of FIG. 6A.

Figure 6B:
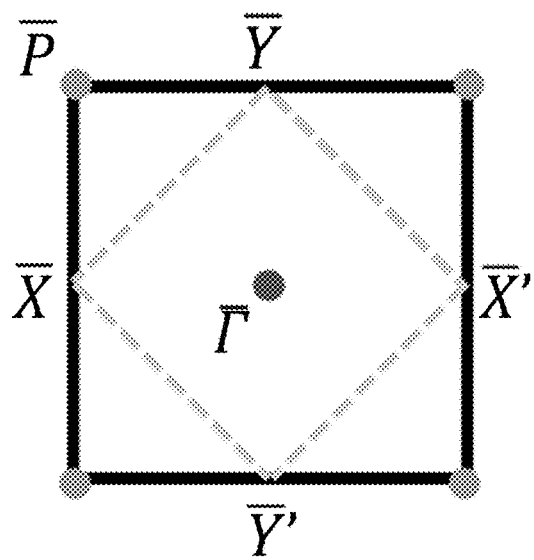
FIG. 6B shows the surface BZ of FIG. 5A centered at $\overline{\Gamma}$.
Figure 6C:
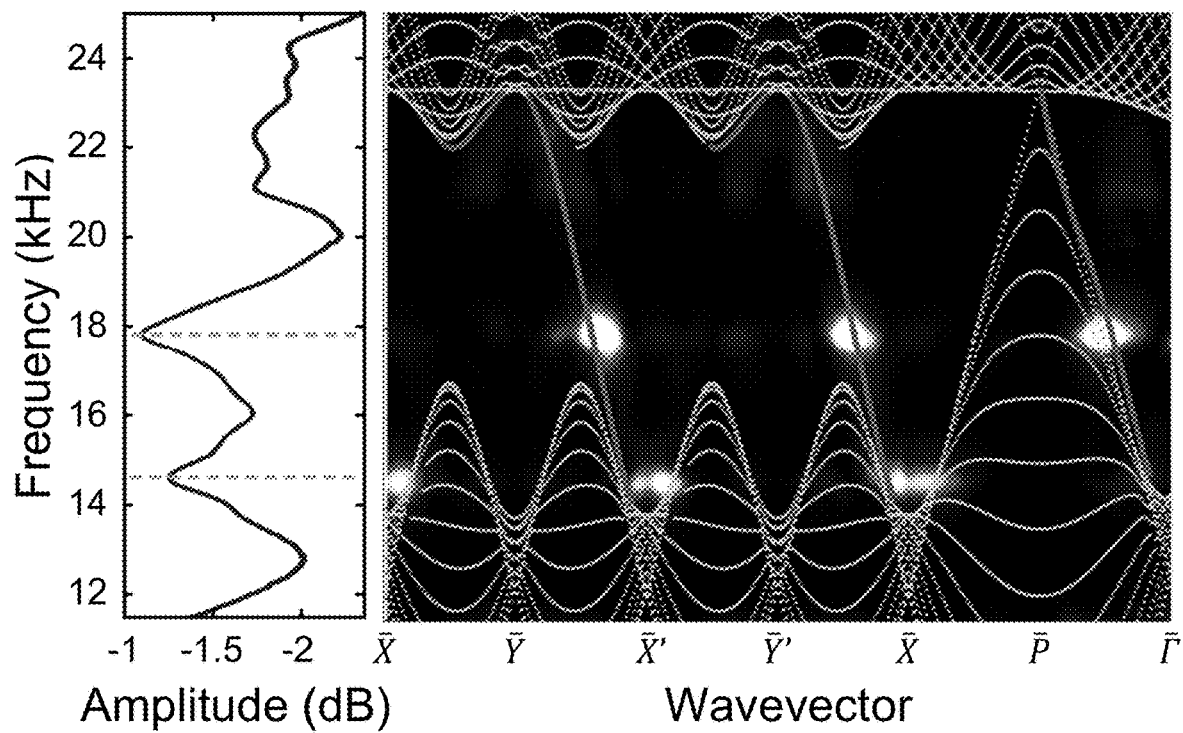
FIG. 6C shows the measured average surface transmission (left) and the surface dispersion along the high-symmetry lines (right). The dots and the fitted line in the surface dispersion denote numerically predicted bulk modes and surface modes, respectively.
Figure 6D:
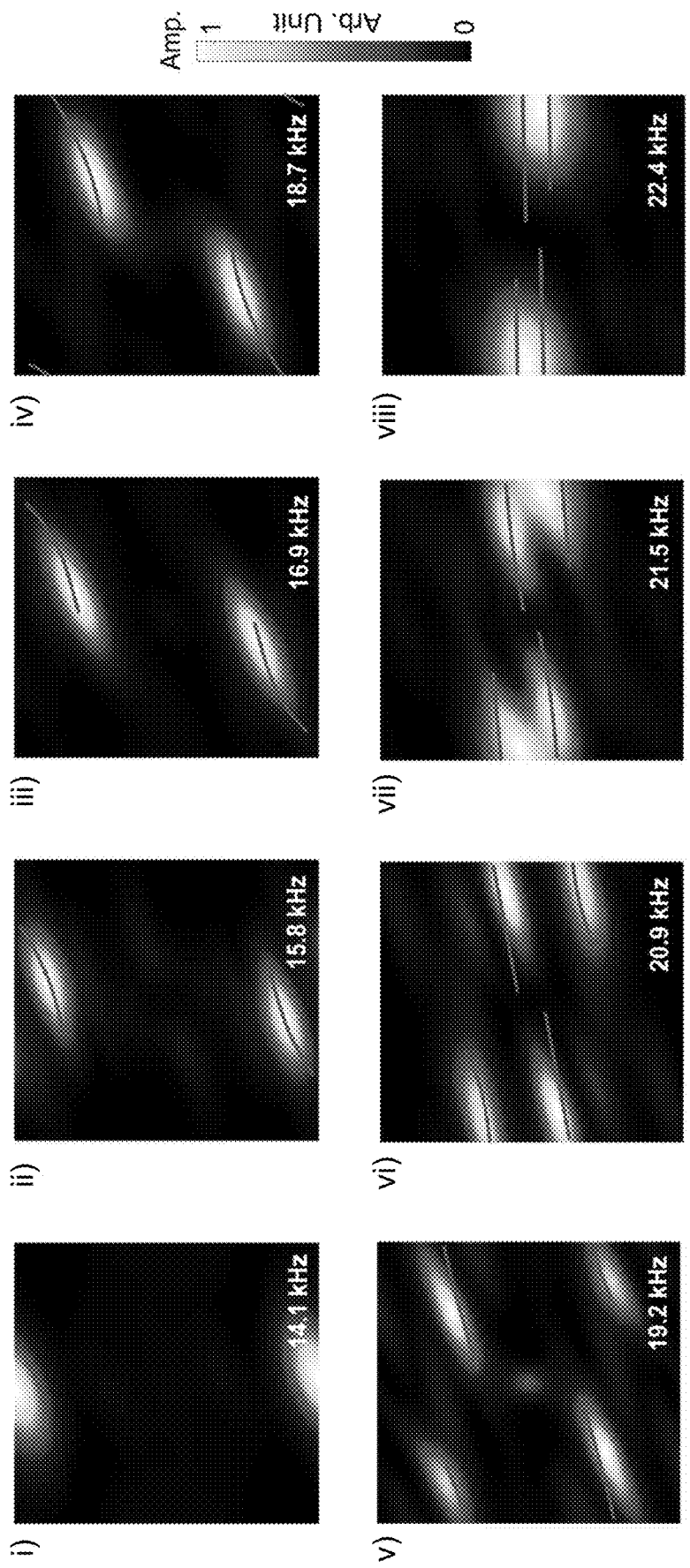
FIG. 6D shows experimental observation of surface arcs for various frequencies. The lines denote numerically predicted surface arcs.

The measured pressure field p(x, y, t) was transformed to its reciprocal space representation $\hat{p}(k_x, k_y, \omega)$ through a 3D Fourier transformation which produces a representation of the wavefield in the frequency/wavenumber domain [65]. FIG. 6B specifies the surface BZ used in the analysis of the experimental results, which maintains the projection at the $k_x$-$k_y$ plane but with the center shifted from $\overline{P}$ to $\overline{\Gamma}$. FIG. 6C compares the measured transmission spectra to the numerical surface dispersion along the specific momentum path indicated in FIG. 6B. The light gray dots correspond to bulk modes while the dark gray lines denote the chiral surface modes localized at the top surface. The measured pressure field confirms the excitation of the chiral surface states predicted by the numerical simulations. The left panel in FIG. 6C shows the frequency spectrum of the pressure field averaged across the top surface, where the response amplitude varies with frequency considering the acoustic resonances in the sample. The transmission peaks indicated by the horizontal dashed lines coincide with the frequencies highlighted in the right panel. The matching of the high amplitude regions between the two panels occurs since the average transmission at the surface coincides with the average taken in reciprocal space coordinates $k_x$-$k_y$ via a $L_2$ norm due to Parseval's theorem of Fourier transforms. Isofrequency contours of the surface dispersion at selected frequencies illustrate the surface arcs: eight representative experimentally observed surface arcs are displayed in FIG. 6D at frequencies of 14.1, 15.8, 16.9, 18.7, 19.2, 20.9, 21.5, and 22.4 kHz, respectively. The shading ranges are adjusted for each panel for better visualization of the wavefield in the wavenumber domain. We note that for increasing frequencies, the surface arcs in the surface BZ progressively rotate and align along the horizontal direction, which is in good agreement with the numerical predictions (solid lines). The open surface arcs are indicative of directional propagation of the acoustic surface modes, which are further explored in the following.

Figure 7A:
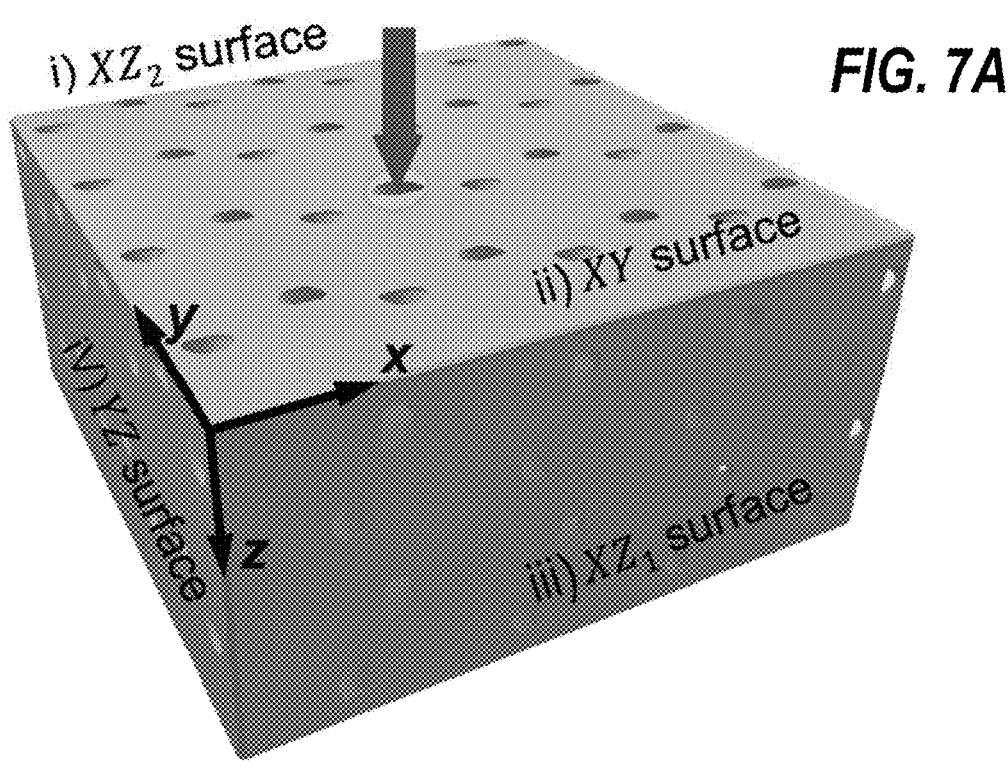
FIG. 7A shows the excitation configuration and measured surfaces for refraction tests: i) $XZ_2$ surface, ii) XY surface, iii) $XZ_1$ surface, and iv) YZ surface.
Figure 7B:
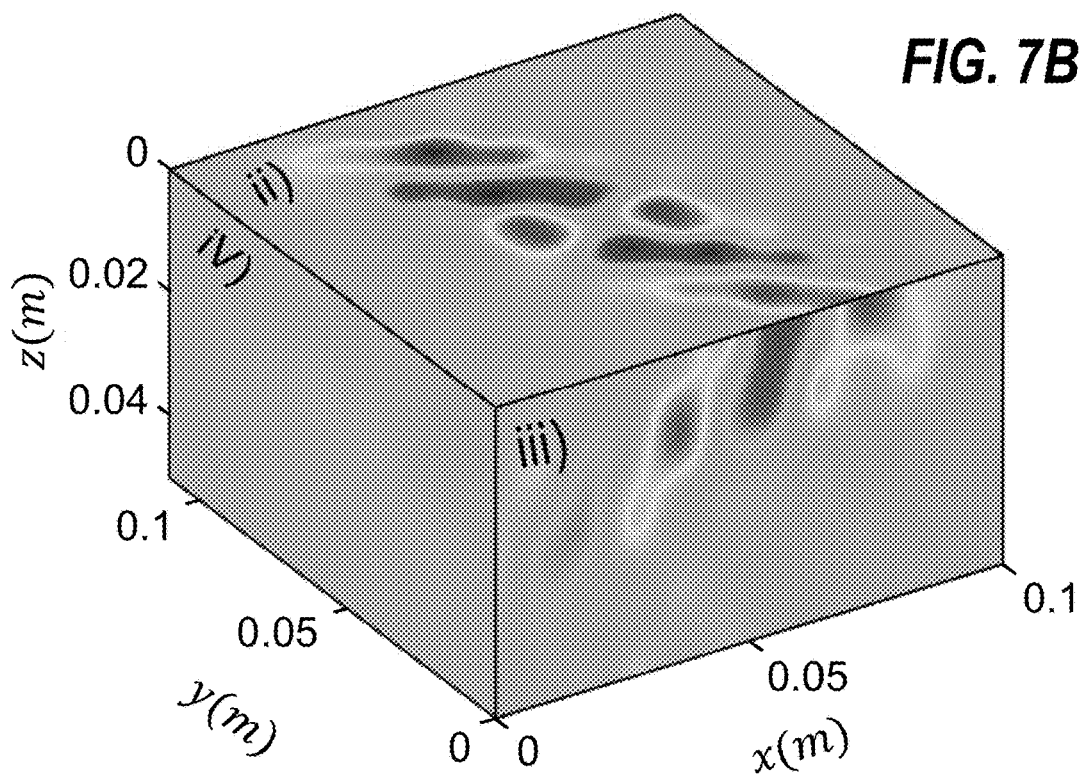
FIG. 7B illustrates the measured acoustic fields at 18.4 kHz.
Figure 7C:
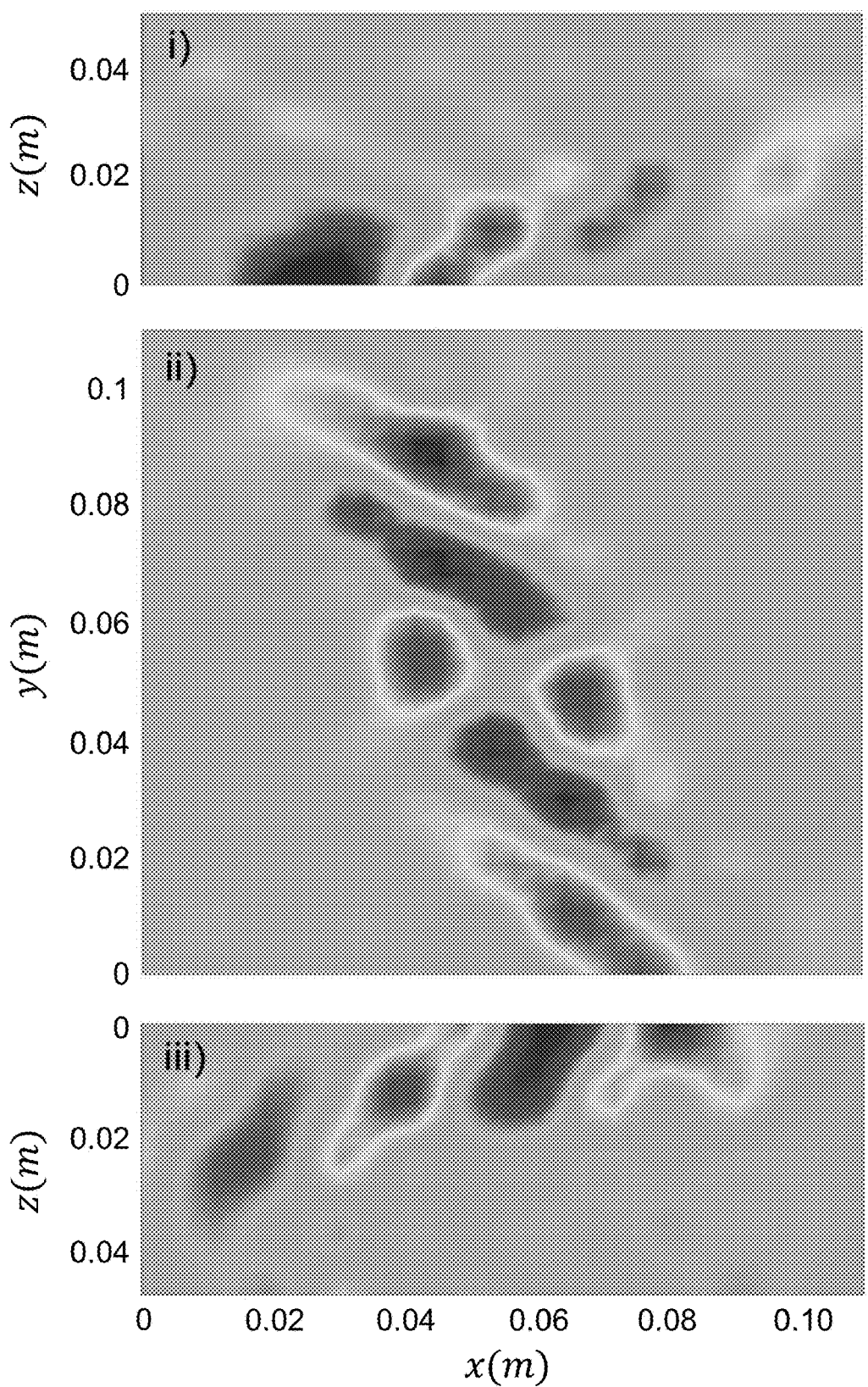
FIG. 7C are plots of the measured acoustic fields at 18.4 kHz showing negative refraction at surface interfaces.
Figure 7D:
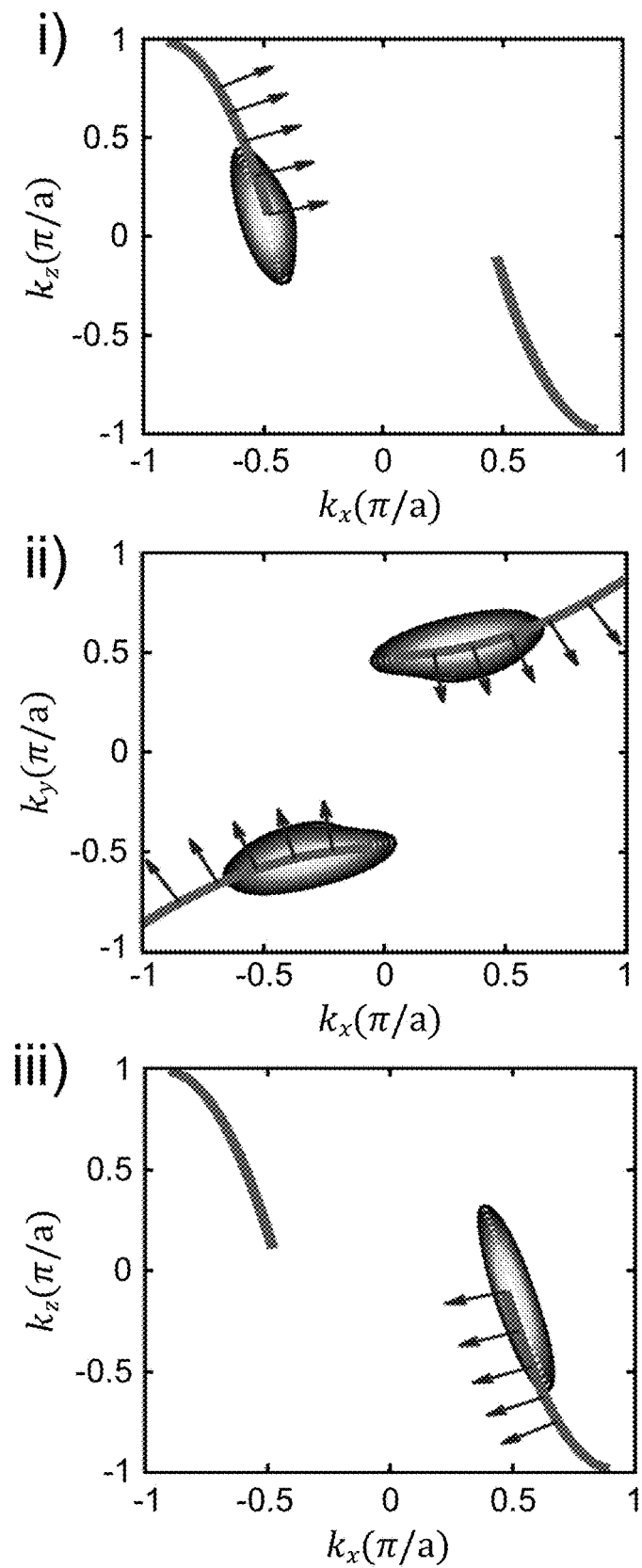
FIG. 7D shows reciprocal space representations of measured acoustic fields (contours), and comparison with theoretical isofrequency lines corresponding to the arcs (solid lines). The arrows represent the directions of the group velocity that are normal to the isofrequency contours.

The topological surface arcs give rise to negative refraction across the surfaces of the sample [40, 66]. The excitation configuration for the recording of the acoustic field at the frequency where negative refraction is expected is shown in FIG. 7A. For the experiments, the holes on the surfaces to be measured were sealed to mimic hard boundary conditions, and a source was fixed at the center of the XY surface. The analysis here involves the surface acoustic fields on the XY, YZ, $XZ_1$, and $XZ_2$ surfaces, which were measured using the same procedures and excitation conditions as in the experimental analysis of FIGS. 6A-6D, but with hole-by-hole scanning of all surfaces of interest. FIG. 7B provides a representation of the experimentally measured acoustic fields in 3D at a frequency of 18.4 kHz, while FIG. 7C shows the separate fields at the i) $XZ_2$, ii) XY, and iii) $XZ_1$ surfaces. The results illustrate the confinement of the acoustic fields to the $XZ_2$, XY, and $XZ_1$ surfaces according to the excitation of the surface states, while the field at the YZ surface confirms the lack of penetration into the bulk of the sample due to the surface-confined source that excites mostly surface states. Also, the wave propagation at the XY surface is highly directional, as predicted by its open surface arcs, and exhibits negative refraction as it propagates into the $XZ_1$ and $XZ_2$ surfaces. This behavior is further illustrated by the contours shown in FIG. 7D representing the measured acoustic fields in the reciprocal space, which are overlaid to, and agree with, the numerically predicted isofrequency contours (solid lines). The arrows pointing along the normal directions to the contours in FIG. 7D indicate the directions of group velocity, which correspond to the directions along which waves propagate at that frequency [67]. The surface arcs exhibit small curvatures for a wide range of wavevectors, allowing the acoustic waves to propagate nearly in the same direction, as FIG. 7C shows. Due to the body-centered cubic symmetry of the gyroid surface, the surface arcs in the surface BZs at the xy, yz, and xz planes are the same but rotated in reciprocal space. Indeed, the surface arcs at the XZ and YZ surfaces are identical to the surface arcs observed at the XY surface, with their isofrequency contours rotated by 90° as shown in FIG. 7D (considering a fixed perspective with $k_x$ as the x-axis). The source at the center of the XY surface excites the chiral surface modes with two opposite propagation directions (upward and downward propagation), which can be interpreted from the directions of group velocities demonstrated in the corresponding wavevector space (panel (ii) in FIG. 7D). When the generated acoustic wave reaches the interface between two adjoining surfaces, it propagates in the neighboring surface according to its surface arc, which is rotated by 90°, thereby leading to negative refraction. The non-zero topological charges of the multifold degenerate points in this design guarantee the existence of the open arcs, ensuring the observation of negative refraction of topologically protected acoustic waves.

4. Conclusions

We investigated a gyroid acoustic crystal that implements a phononic "semimetal" phase. The chiral morphology and nonsymmorphic symmetry of the gyroid surface lead to topological degeneracies and chiral surface states, which are predicted numerically and confirmed experimentally. The topological states are not only confined to the surfaces but are also characterized by highly directional propagation and negative refraction when traversing an edge separating two surfaces of the crystal. We demonstrate these properties on a rigid material block that incorporates gyroid acoustic channels. These features rely solely on the symmetry of the gyroid, which makes the design easily scalable to other length scales and operating frequencies. Our results pave the way to exploiting the observed topological phases of matter for acoustic materials that have the ability to confine sound according to surface states, and that are characterized by anomalous (negative) refraction as the sound propagates across edges of a solid with gyroid channels. These characteristics may prove useful in enhancing the absorption of incident sound, or in reducing the transmission of sound across an acoustic panel design with the considered gyroid channels tuned for a frequency range of interest.

5. Experimental Section

Simulations: The geometry of the gyroid acoustic crystal was constructed by considering the isosurface function in MATLAB with a given lattice constant and F value, and then exporting it as a .stl file to the COMSOL Multiphysics software for the modeling and simulations shown herein. All simulations were conducted in the "Pressure Acoustics" module of COMSOL Multiphysics. The gyroid channels were filled with air and only the acoustic wave propagating in the air was considered in the simulation. The density and the acoustic velocity of the air were 1.2 kg·m$^{-3}$ and 343 m·s$^{-1}$, respectively. For the bulk dispersion obtained from the unit cell, periodic boundary conditions were applied in all three directions. For the surface dispersion in the surface Brillouin zone, a ribbon structure with 1×1×8 cells was used and periodic boundary conditions were imposed along the x and y directions, while rigid boundary conditions were applied along the z direction. Surface states were identified from the bulk states by inspecting the surface localization of the eigenstates.

Experiments: The physical test sample of the gyroid acoustic crystal was 3D-printed through fused deposition modeling using a Markforged printing machine and the Onyx material. The size of this acoustic sample was 120 mm×120 mm×60 mm. A broadband sound signal with a sweeping frequency of 10-26 kHz was launched from a deep sub-wavelength tube (inner diameter 4 mm, $\approx 0.2\lambda_{acoustic}$) to experimentally excite the surface states. The distribution of the acoustic pressure field was manually measured through a portable probe microphone (GRAS type 46BD) with a radius of 3.2 mm. In the measurements, the microphone was moved to scan the 2D acoustic surface field point by point, where the scanning steps were given by the lattice spacing of 10 mm. The amplitude and phase of the acoustic pressure field were recorded by a Data Translation DT9857E signal analyzer. The recorded signals were then post-processed within the Matlab environment.

Embodiments NEAR F=0

Figure 8A:
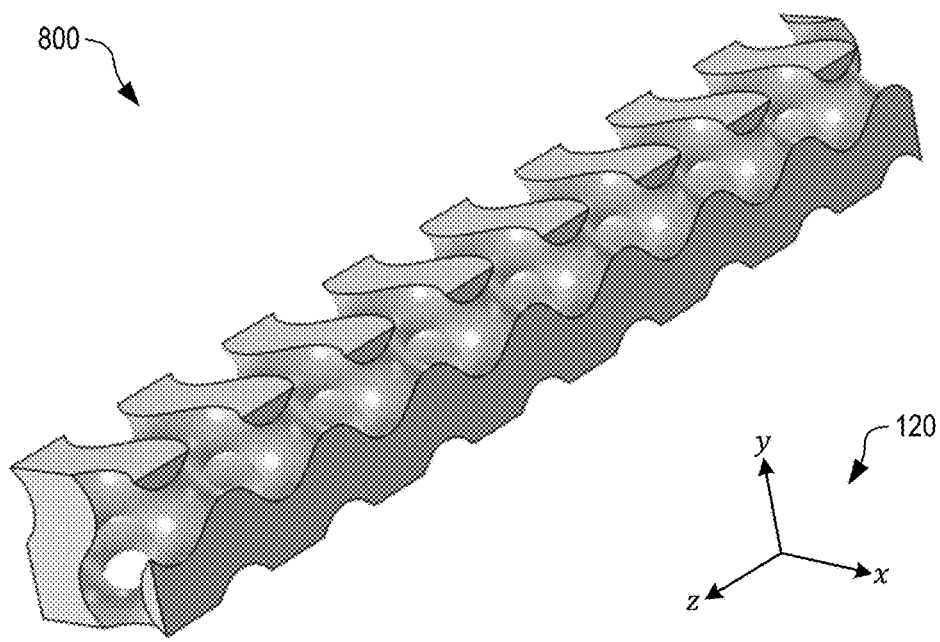
FIG. 8A is a perspective view of a portion of a phononic crystal that is similar to the phononic crystal of FIG. 1 except that the surface between the first and second regions is given by the single-gyroid isosurface with F=0, in an embodiment.
Figure 8B:
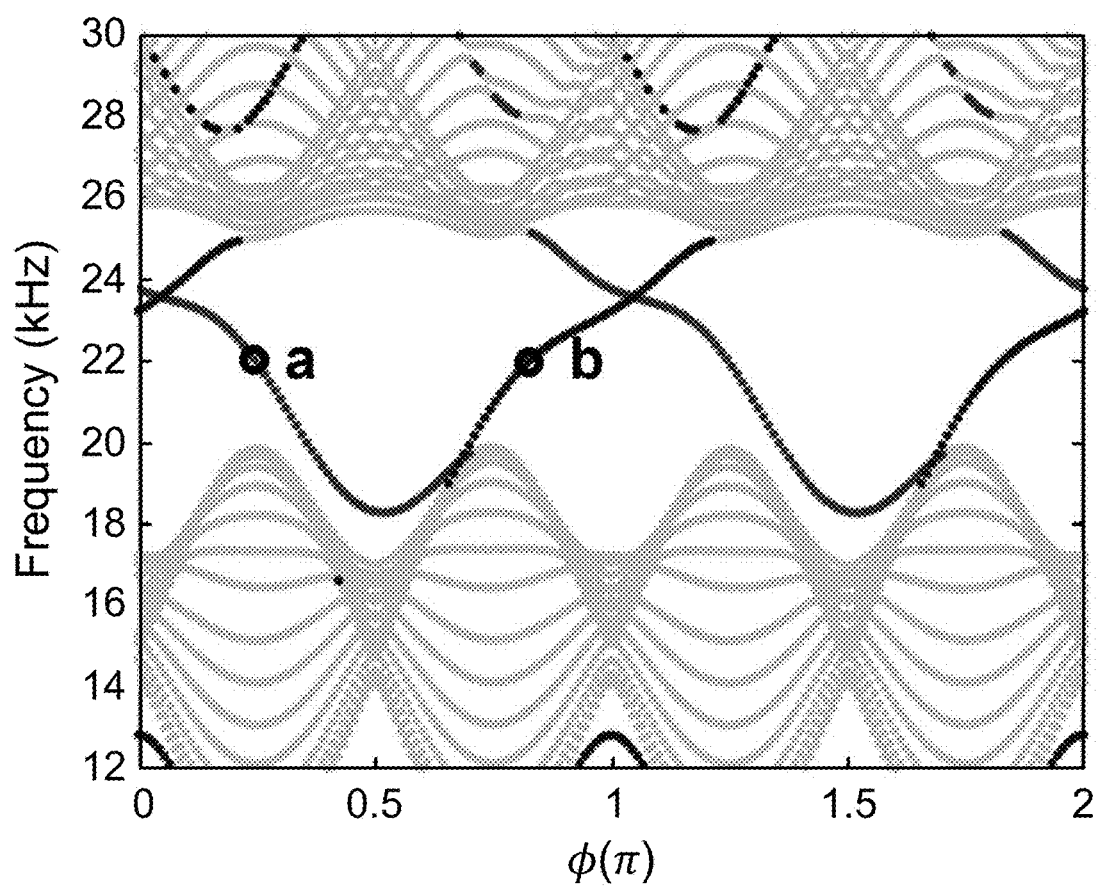
FIG. 8B is a plot of surface dispersion for the phononic crystal of FIG. 8A.

FIG. 8A is a perspective view of a portion of a phononic crystal 800 that is similar to the phononic crystal 100 of FIG. 1 except that the surface between the first and second regions is given by the isosurface of Eqn. 1 with F=0 (see FIG. 3A). While FIG. 8A shows a 1×1×8 portion of the phononic crystal 800, it should be understood that periodic boundary conditions are applied along the x and y directions, and therefore the phononic crystal 800 is three-dimensional. FIG. 8B is a plot of surface dispersion along a circular momentum loop centered at the symmetry point $\overline{P}$ (see FIG. 5A). Thus, FIG. 8B is similar to FIG. 5E except that it was calculated for the phononic crystal 800 of FIG. 8A (F=0) rather than the phononic crystal 100 of FIG. 1 (F=1.08).

Figure 8C:
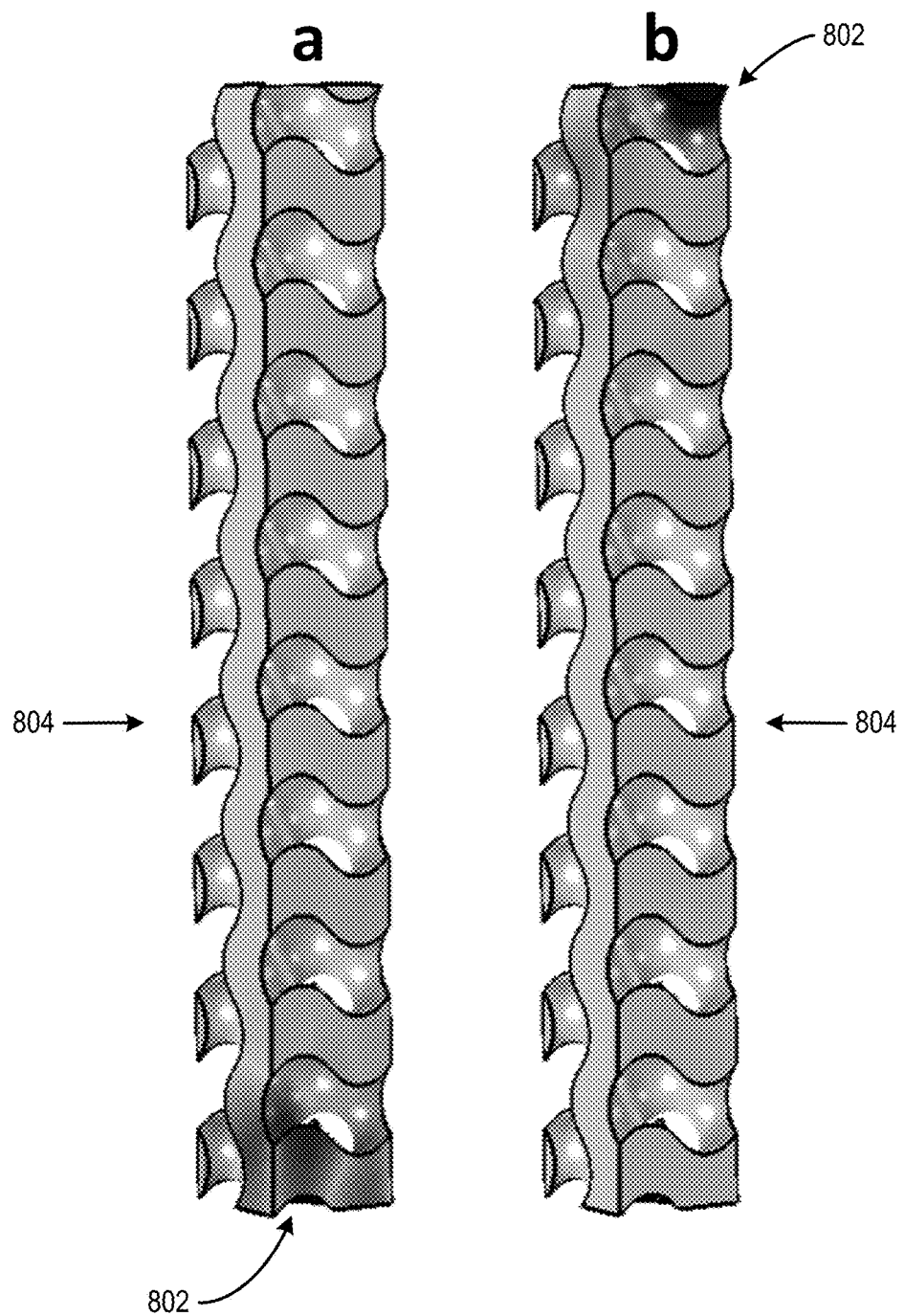
FIG. 8C is a plot showing the existence of chiral surface modes on the phononic crystal of FIG. 8A.

FIG. 8C is a plot showing the existence of chiral surface modes at the points (a) and (b) labeled in FIG. 8B. In FIG. 8C, the dark regions identify these chiral surface modes 802 while the lighter gray regions indicate bulk modes 804. The existence of the chiral surface modes 802 demonstrates that the present embodiments can work for values of F near, or equal to 0, and thus also for a true minimal gyroid surface. Accordingly, F=0 in some of the present embodiments.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

REFERENCES

[1] K. Grosse-Brauckmann, *Interface Focus* 2012, 2, 582.
[2] X. Zheng, Z. Fu, K. Du, C. Wang, Y. Yi, *J. Mater. Sci.* 2018, 53, 10194.
[3] S. C. Han, J. W. Lee, K. Kang, *Adv. Mater.* 2015, 27, 5506.
[4] S. J. Yeo, M. J. Oh, P. J. Yoo, *Adv. Mater.* 2019, 31, 1803670.
[5] M. Sychov, L. Lebedev, S. Dyachenko, L. Nefedova, *Acta Astronaut.* 2018, 150, 81.
[6] L. Yang, C. Yan, C. Han, P. Chen, S. Yang, Y. Shi, *Int. J. Mech. Sci.* 2018, 148, 149.
[7] D. W. Abueidda, I. Jasiuk, N. A. Sobh, *Mater. Des.* 2018, 145, 20.
[8] Y. Guo, M. I. N. Rosa, M. Gupta, B. E. Dolan, B. Fields, L. Valdevit, M. Ruzzene, *Adv. Funct. Mater.* 2022, 32, 2204122.
[9] L. Zhang, S. Feih, S. Daynes, S. Chang, M. Y. Wang, J. Wei, W. F. Lu, *Addit. Manuf* 2018, 23, 505.
[10] Z. Cheng, R Xu, P.-X. Jiang, Int. J. *Heat Mass Transfer* 2021, 170, 120902.
[11] E. Yang, M. Leary, B. Lozanovski, D. Downing, M. Mazur, A. Sarker, A. Khorasani, A. Jones, T. Maconachie, S. Bateman, *Mater. Des.* 2019, 184, 108165.
[12] L. Yang, R Mertens, M. Ferrucci, C. Yan, Y. Shi, S. Yang, *Mater. Des.* 2019, 162, 394.
[13] K. Nakanishi, D. Labonte, T. Cebo, V. P. Veigang-Radulescu, Y. Fan, B. Brennan, A. J. Pollard, S. Hofinann, N. A. Fleck, *Acta Mater.* 2020, 201, 254.
[14] C. Kilchoer, N. Abdollahi, J. A. Dolan, D. Abdelrahman, M. Saba, U. Wiesner, U. Steiner, I. Gunkel, B. D. Wilts, *Adv. Opt. Mater.* 2020, 8, 1902131.
[15] M. Saba, G. E. Schroder-Turk, *Crystals* 2015, 5, 14.
[16] J. A. Dolan, R Dehmel, A. Demetriadou, Y. Gu, U. Wiesner, T. D. Wilkinson, I. Gunkel, O. Hess, J. J. Baumberg, U. Steiner, *Adv. Mater.* 2019, 31, 1803478.
[17] J. A. Dolan, B. D. Wilts, S. Vignolini, J. J. Baumberg, U. Steiner, T. D. Wilkinson, *Adv. Opt. Mater.* 2015, 3, 12.
[18] E. Goi, B. P. Cumming, M. Gu, *Adv. Opt. Mater.* 2018, 6, 1800485.
[19] L. Wang, S.-K. Jian, H. Yao, *Phys. Rev. A* 2016, 93, 061801.
[20] M. D. Turner, G. E. Schroder-Turk, M. Gu, *Opt. Express* 2011, 19, 10001.
[21] S. Khaderi, V. Deshpande, N. Fleck, *Int. J. Solids Struct.* 2014, 51, 3866.
[22] L. Li, L. Schulte, L. D. Clausen, K. M. Hansen, G. E. Jonsson, S. Ndoni, *ACS Nano* 2011, 5, 7754.
[23] M. Saba, M. Thiel, M. D. Turner, S. T. Hyde, M. Gu, K. Grosse-Brauckmann, D. N. Neshev, K. Mecke, G. E. Schroder-Turk, *Phys. Rev. Lett.* 2011, 106, 103902.
[24] L. Lu, Z. Wang, D. Ye, L. Ran, L. Fu, J. D. Joannopoulos, M. Soljačić, *Science* 2015, 349, 622.
[25] M. D. Turner, M. Saba, Q. Zhang, B. P. Cumming, G. E. Schroder-Turk, M. Gu, *Nat. Photonics* 2013, 7, 801.

[26] Z. Yang, F. Gao, X. Shi, X. Lin, Z. Gao, Y. Chong, B. Zhang, *Phys. Rev. Lett.* 2015, 114, 114301.
[27] P. Wang, L. Lu, K. Bertoldi, *Phys. Rev. Lett.* 2015, 115, 104302.
[28] S. H. Mousavi, A. B. Khanikaev, Z. Wang, *Nat. Commun.* 2015, 6, 8682.
[29] M. Yan, J. Lu, F. Li, W. Deng, X. Huang, J. Ma, Z. Liu, *Nat. Mater.* 2018, 17, 993.
[30] B. Q. Lv, T. Qian, H. Ding, *Rev. Mod Phys.* 2021, 93, 025002.
[31] A. A. Burkov, *Nat. Mater.* 2016, 15, 1145.
[32] S. Velury, T. L. Hughes, *Phys. Rev. B* 2022, 105, 184105.
[33] B. Yang, Q. Guo, B. Tremain, R. Liu, L. E. Barr, Q. Yan, W. Gao, H. Liu, Y. Xiang, J. Chen, *Science* 2018, 359, 1013.
[34] L. Lu, L. Fu, J. D. Joannopoulos, M. Soljačić, *Nat. Photonics* 2013, 7, 294.
[35] H. He, C. Qiu, X. Cai, M. Xiao, M. Ke, F. Zhang, Z. Liu, *Nat. Commun* 2020, 11, 1820.
[36] F. Li, X. Huang, J. Lu, J. Ma, Z. Liu, *Nat. Phys.* 2018, 14, 30.
[37] M. Xiao, L. Ye, C. Qiu, H. He, Z. Liu, S. Fan, *Sci. Adv.* 2020, 6, 2360.
[38] Y. Yang, J.-p. Xia, H.-x. Sun, Y. Ge, D. Jia, S.-q. Yuan, S. A. Yang, Y. Chong, B. Zhang, *Nat. Commun.* 2019, 10, 5185.
[39] L. Luo, H.-X. Wang, Z.-K. Lin, B. Jiang, Y. Wu, F. Li, J.-H. Jiang, *Nat. Mater.* 2021, 20, 794.
[40] Y. Yang, H.-x. Sun, J.-p. Xia, H. Xue, Z. Gao, Y. Ge, D. Jia, S.-q. Yuan, Y. Chong, B. Zhang, *Nat. Phys.* 2019, 15, 645.
[41] X. Cai, L. Ye, C. Qiu, M. Xiao, R Yu, M. Ke, Z. Liu, *Light. Sci. Appl.* 2020, 9, 38.
[42] B. Bradlyn, J. Cano, Z. Wang, M. Vergniory, C. Felser, R J. Cava, B. A. Bernevig, *Science* 2016, 353, 5037.
[43] C. Fang, Y. Chen, H.-Y. Kee, L. Fu, *Phys. Rev. B* 2015, 92, 081201.
[44] A. Bansil, H. Lin, T. Das, *Rev. Mod Phys.* 2016, 88, 021004.
[45] B. J. Wieder, B. Bradlyn, J. Cano, Z. Wang, M. G. Vergniory, L. Elcoro, A. A. Soluyanov, C. Felser, T. Neupert, N. Regnault, B. A. Bernevig, *Nat. Rev. Mater.* 2022, 7, 196.
[46] M. Fruchart, S.-Y. Jeon, K. Hur, V. Cheianov, U. Wiesner, V. Vitelli, *Proc. Natl. Acad Sci. U.S.A.* 2018, 115, E3655.
[47] H. Cheng, Y. Sha, R Liu, C. Fang, L. Lu, *Phys. Rev. Lett.* 2020, 124, 104301.
[48] A. P. Schnyder, *Lecture Notes on Accidental and Symmetry-Enforced Band Crossings in Topological Semimetals*, Topological Matter School, San Sebastian, Spain 2018.
[49] O. Delgado-Friedrichs, S. Hyde, M. O'Keeffe, *Acta Crystallogr., Sect. A* 2013, 69, 483.
[50] X. Cao, D. Xu, Y. Yao, L. Han, O. Terasaki, S. Che, S. Che, *Chem. Mater.* 2016, 28, 3691.
[51] X. Feng, M. Zhuo, H. Guo, E. L. Thomas, *Proc. Natl. Acad Sci. U.S.A* 2021, 118, e2018977118.
[52] M. R J. Scherer, *Double-Gyroid-Structured Functional Materials: Synthesis and Applications*, Springer International Publishing, Switzerland 2013.
[53] S. S. Oh, A. Demetriadou, S. Wuestner, O. Hess, *Adv. Mater.* 2013, 25, 612.
[54] H.-X. Wang, G.-Y. Guo, J.-H. Jiang, *New J. Phys.* 2019, 21, 093029.
[55] Y. Hwang, J. Ahn, B.-J. Yang, *Phys. Rev. B* 2019, 100, 205126.
[56] A. Bouhon, A. M. Black-Schaffer, *Phys. Rev. B* 2017, 95, 241101.
[57] W. Wu, Z.-M. Yu, X. Zhou, Y. X. Zhao, S. A. Yang, *Phys. Rev. B* 2020, 101, 205134.
[58] T. Zhang, Z. Song, A. Alexandradinata, H. Weng, C. Fang, L. Lu, Z. Fang, *Phys. Rev. Lett.* 2018, 120, 016401.
[59] X.-Y. Mai, Y.-Q. Zhu, Z. Li, D.-W. Zhang, S.-L. Zhu, *Phys. Rev. A* 2018, 98, 053619.
[60] H. Hu, J. Hou, F. Zhang, C. Zhang, *Phys. Rev. Lett.* 2018, 120, 240401.
[61] J. L. Manes, *Phys. Rev. B* 2012, 85, 155118.
[62] G. Xu, H. Weng, Z. Wang, X. Dai, Z. Fang, *Phys. Rev. Lett.* 2011, 107, 186806.
[63] S.-Y. Xu, C. Liu, S. K. Kushwaha, R. Sankar, J. W. Krizan, I. Belopolski, M. Neupane, G. Bian, N. Alidoust, T.-R. Chang, *Science* 2015, 347, 294.
[64] X. Wan, A. M. Turner, A. Vishwanath, S. Y. Savrasov, *Phys. Rev. B* 2011, 83, 205101.
[65] J. Vila, R. K. Pal, M. Ruzzene, *Phys. Rev. B* 2017, 96, 134307.
[66] H. He, C. Qiu, L. Ye, X. Cai, X. Fan, M. Ke, F. Zhang, Z. Liu, *Nature* 2018, 560, 61.
[67] M. Addouche, M. A. Al-Lethawe, A. Choujaa, A. Khelif, *Appl. Phys. Lett.* 2014, 105, 023501.

What is claimed is:

1. An acoustic device, comprising:
a three-dimensional phononic crystal having cubic symmetry and comprising:
a first region filled with a first material; and
a second region that is the solid complement of the first region, the second region being filled with a solid material that is different from the first material;
wherein:
a boundary between the first and second regions is shaped as a single gyroid surface with constant mean curvature and not pinched off; and
a second volume of the second region is greater than a first volume of the first region.

2. The acoustic device of claim 1, the first material comprising a fluid.

3. The acoustic device of claim 2, the solid material being stiffer than the fluid.

4. The acoustic device of claim 2, the fluid comprising a gas.

5. The acoustic device of claim 4, the gas comprising air.

6. The acoustic device of claim 1, the three-dimensional phononic crystal supporting topological surface states.

7. The acoustic device of claim 1, the three-dimensional phononic crystal exhibiting a band structure that has at least one degenerate point that is protected by nonsymmorphic symmetry.

8. The acoustic device of claim 1, the solid material fully filling a solid complement of a unit cell of the three-dimensional phononic crystal.

9. The acoustic device of claim 1, the gyroid surface being mathematically approximated by the isosurface function:

$$F=\cos(\tilde{x})\sin(\tilde{y})+\cos(\tilde{y})\sin(\tilde{z})+\cos(\tilde{z})\sin(\tilde{x}),$$

wherein:
$\tilde{x}=2\pi x/a$, $\tilde{y}=2\pi y/a$, and $\tilde{z}=2\pi z/a$ are scaled spatial coordinates along the x, y, and z axes, respectively, of a unit cell of the three-dimensional phononic crystal;
a is a length of the unit cell; and
F is a constant such that $0 \leq |F| < F_{po}$, $F_{po}$ being the value of F at which the pinch-off regime begins.

10. The acoustic device of claim 9, the constant F having a value such that $1 \leq |F| < F_{po}$.

11. The acoustic device of claim 1, a volume fraction of the three-dimensional phononic crystal being greater than 50% and less than 97.1%.

12. The acoustic device of claim 1, the solid material comprising plastic, metal, glass, ceramic, polymer, carbon fiber, or resin, or any combination thereof.

13. The acoustic device of claim 1, wherein:
the three-dimensional phononic crystal is bounded by a plurality of external surfaces; and
the acoustic device exhibits acoustic negative refraction where two of the plurality of external surfaces meet.

14. The acoustic device of claim 1, wherein:
the three-dimensional phononic crystal is bounded by a first external surface;
the acoustic device further comprises an acoustic material bounded by a second external surface; and
the second external surface directly contacts the first external surface to form an acoustic interface therebetween.

15. A method, comprising coupling an acoustic wave into the acoustic device of claim 1 to excite a topological surface state of the three-dimensional phononic crystal.

16. A method, comprising guiding an acoustic wave along a surface of the acoustic device of claim 1.

17. A method, comprising energy harvesting with the acoustic device of claim 1.

18. A method comprising coupling an acoustic wave into the acoustic device of claim 14 to excite a topological surface state of the acoustic interface.

19. A method comprising guiding an acoustic wave along the acoustic interface of the acoustic device of claim 14.

* * * * *